(12) United States Patent
Tarokh et al.

(10) Patent No.: US 7,397,864 B2
(45) Date of Patent: Jul. 8, 2008

(54) INCREMENTAL REDUNDANCY WITH SPACE-TIME CODES

(75) Inventors: Vahid Tarokh, Belmont, MA (US); Ming Jia, Ottawa (CA); Wen Tong, Ottawa (CA); Peiying Zhu, Kanata (CA); Jianglei Ma, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 802 days.

(21) Appl. No.: 10/251,935

(22) Filed: Sep. 20, 2002

(65) Prior Publication Data

US 2004/0057530 A1    Mar. 25, 2004

(51) Int. Cl.
*H04L 27/00* (2006.01)
(52) U.S. Cl. ................... 375/299; 375/267; 375/347
(58) Field of Classification Search ................ 375/295, 375/299, 316, 337, 341, 347, 348–349, 260, 375/267
See application file for complete search history.

(56) References Cited

U.S. PATENT DOCUMENTS

| | | | | |
|---|---|---|---|---|
| 5,689,439 | A * | 11/1997 | Weerackody et al. | 370/329 |
| 6,351,499 | B1 * | 2/2002 | Paulraj et al. | 375/267 |
| 6,985,434 | B2 * | 1/2006 | Wu et al. | 370/208 |
| 7,103,325 | B1 * | 9/2006 | Jia et al. | 455/101 |

(Continued)

FOREIGN PATENT DOCUMENTS

| | | |
|---|---|---|
| CN | 1663163 A | 8/2005 |
| EP | 1 172 959 A2 | 1/2002 |

(Continued)

OTHER PUBLICATIONS

Sayeed, Zulfiquar, "Throughput Analysis and Design of Fixed and Adaptive ARQ/Diversity Systems for Slow Fading Channels," Global Telecommunications Conference, 1998, IEEE Sydney, NSW Australia, Nov. 8-12, 1998.

(Continued)

*Primary Examiner*—Chieh M. Fan
*Assistant Examiner*—Freshteh N. Aghdam
(74) *Attorney, Agent, or Firm*—Withrow & Terranova, PLLC

(57) ABSTRACT

The present invention relates to space-time coding techniques capable of providing incremental redundancy in wireless communication environments incorporating spatial and temporal diversity. In general, a transmitter sends packets, via blocks of symbols, to a receiver with high bandwidth efficiency and only in the event that the receiver does not correctly receive a data packet does the transmitter send additional symbols to assist with the decoding of the incorrectly received packet. A hybrid ARQ feedback mechanism is used such that the receiver can inform the transmitter whether the packets were correctly or incorrectly received. From the feedback, the transmitter can determine whether to send new symbols or initiate incremental redundancy. By combining the received words corresponding to the redundant symbols and those of the original packet transmission, additional diversity, coding gain, signal energy, or a combination thereof are provided to the receiver and are used to correctly decode the transmitted data.

55 Claims, 13 Drawing Sheets

U.S. PATENT DOCUMENTS

| | | | |
|---|---|---|---|
| 2002/0093937 A1* | 7/2002 | Kim et al. | 370/349 |
| 2002/0165626 A1* | 11/2002 | Hammons et al. | 700/53 |
| 2003/0066004 A1* | 4/2003 | Rudrapatna et al. | 714/751 |
| 2003/0072285 A1* | 4/2003 | Onggosanusi et al. | 370/335 |
| 2003/0156572 A1* | 8/2003 | Hui et al. | 370/349 |

FOREIGN PATENT DOCUMENTS

| | | |
|---|---|---|
| EP | 1 185 001 A2 | 3/2002 |
| WO | 03/101029 A1 | 12/2003 |

OTHER PUBLICATIONS

Nguyen, Anh and Ingram, Mary, "Hybrid ARQ Protocols Using Space-time Codes," IEEE 54th Vehicular Technology Conference Proceedings, Atlantic City, NJ Oct. 7-11, 2001.

International Search Report for counterpart application PCT/IB03/02684, mailed Dec. 2, 2003.

\* cited by examiner

INCREMENTAL REDUNDANCY WITH SPACE-TIME CODES

FIELD OF THE INVENTION

The present invention relates to wireless communications, and in particular to facilitating incremental redundancy using space-time codes in a spatially diverse communication environment.

BACKGROUND OF THE INVENTION

In recent years, there has been an explosive growth in demand for wireless data services, and the evolution from wireless voice to wireless data is causing exponentially increasing demand for wireless capacity. With already more than one billion subscribers worldwide, subscription to wireless services is expected to exceed those of wire-line services by the year 2005. This has forced wireless service providers and equipment vendors to look into ways of increasing the data rates of wireless systems and has motivated an enormous body of research.

The wireless channel suffers from many artifacts such as path loss, shadowing, fading, noise, limited bandwidth, power limitation at the mobile terminal, and interference from other users. These limitations cause the wireless channel to resemble a narrow pipe that does not allow rapid flow of data and make the design of bandwidth efficient high data rate wireless communications a challenging task. Further challenges in wireless system design include the design of resource allocation, mobility issues related to rapidly changing physical channels, portability, and providing privacy and security.

When the transmission channel is experiencing deep fades, it is impossible for the receiver to determine the transmitted signal unless another replica or version of the signal is also sent to the receiver. This resource is called diversity, and is one of the most important single contributors to reliable transmission over wireless channels. Examples of diversity include:

1. Temporal Diversity: Replicas of the transmitted signal are provided to the receiver in the form of redundancy in the temporal domain.
2. Frequency Diversity: The fact that waves transmitted on different frequencies induce different multipath structure in the propagation media is exploited. Replicas of the transmitted signal are provided to the receiver in the form of redundancy in the frequency domain.
3. Spatial Diversity: Spatially separated or differently polarized antennas are used. Replicas of the transmitted signal are provided to the receiver in the form of redundancy in the spatial domain. This can be provided with no penalty in bandwidth efficiency.

Spatial diversity is typically a function of the number and placement of transmit and receive antennas relative to a transmitter and receiver. Systems employing spatial diversity with multiple transmit and receive antennas are generally referred to as multiple-input multiple-output (MIMO) systems. Accordingly, a transmitting device will have N transmit antennas, and the receiving device will have M receive antennas. Space-time coding controls what data is transmitted from each of the N transmit antennas. A space-time encoding function at the transmitter processes data to be transmitted and creates unique information to transmit from the N transmit antennas. Each of the M receive antennas will receive signals transmitted from each of the N transmit antennas. A space-time decoding function at the receiving device will combine the information sent from the N transmit antennas to recover the data.

Space-time coding (STC) is typically implemented using one of many techniques. One exemplary technique encodes the same data in different formats for transmission from the different transmit antennas. Thus, the same data is transmitted in different formats from each of the N transmit antennas. Another exemplary technique transmits different data from different ones of the N transmit antennas wherein the redundancy of the first technique is avoided. The first technique, space-time transmit diversity (STTD), is effective in maximizing diversity but inefficient due to the requisite redundancy. The second technique, which is often referred to as V-BLAST (Vertical-Bell Laboratories Layered Space Time), increases system throughput for systems having sufficient diversity available. Once a threshold amount of diversity is achieved, data rates increase linearly with the number of transmit and receive antennas for BLAST systems, whereas additional spatial diversity has little impact on data rates in STTD systems. Those skilled in the art will recognize other STC techniques such as space-time trellis codes and space-time block codes. Further information related to STTD and BLAST can be found in Siavash M. Alamouti, "A Simple Transmit Diversity Technique for Wireless Communications," IEEE J. Select. Areas Commun., vol. 16, pp. 1451-1458, October 1998; G. J. Foschini, "Layered Space-time Architecture for Wireless Communications in a Fading Environment when Using Multi-element antennas," Bell Labs Tech. J., pp. 41-59, Autumn 1996; G. D. Golden, G. J. Foschini, R. A. Valenzuela, and P. W. Wolniansky, "Detection Algorithm and Initial Laboratory Results Using V-BLAST Space-time Communication Architecture," Electronics Letters, vol. 35, pp. 14-16, Jan. 1999; P. W. Wolniansky, G. J., Foschini, G. D. Golden, and R. A. Valenzuela, "V-BLAST: An Architecture for Realizing Very High Data Rates Over the Rich-scattering Wireless Channel," Proc. IEEE ISSSE-98, Pisa, Italy, September 1998, pp. 295-300; V. Tarokh, et al., "Space-Time Codes for High Data Rate Wireless Communication: Performance Analysis and Code Construction," IEEE Trans. Inform. Theory, pp. 744-765, March 1998; and Eko N. Onggosanusi, et al., "High Rate Space-time Block Coded Scheme: Performance and Improvement in Correlated Fading Channels," IEEE Wireless Communications and Networking Conference, pp. 194-256, Orlando, Fla, USA, Mar. 17-21, 2002, which are incorporated herein by reference.

When there are N transmit and M receive antennas, for each transmission slot, N signals are transmitted at the same time from different transmit antennas. These signals have the same transmission period. Signals transmitted from different antennas undergo independent fades. The received signal at each receive antenna is a linear superposition of the transmitted signals perturbed by noise.

Mathematically speaking, if $s_{t,n}$ is transmitted from antenna n, the signal $r_{t,m}$ received at antenna m is given by:

$$r_{t,m} = \sum_{n=1}^{N} \alpha_{n,m} s_{t,n} + \eta_m. \qquad \text{Eq. 1}$$

The path gain $\alpha_{n,m}$ is the path gain from transmit antenna n to receive antenna m, and $\eta_m$ represents a noise variable. For flat fading, assume that the path gains are constant over a frame and vary from one frame to another.

Under this assumption, criteria for the design of space-time codes can be derived. To describe this criteria, any code word S is written as the space-time matrix:

$$S = \begin{pmatrix} s_{1,1} & s_{1,2} & s_{1,3} & \cdots & \cdots & s_{1,N} \\ s_{2,1} & s_{2,2} & s_{2,3} & \cdots & \cdots & s_{2,N} \\ \vdots & \vdots & \ddots & \ddots & \ddots & \vdots \\ s_{L,1} & s_{L,2} & s_{2,3} & \cdots & \cdots & s_{L,N} \end{pmatrix}. \quad \text{Eq. 2}$$

To send code word S, at time t=1,2, ..., L, the symbols $s_{t,1}$, $s_{t,2}$, ..., $s_{t,N}$ are sent simultaneously from transmit antennas 1, 2, ..., N, respectively. The design criteria for space-time codes require that for any two code words $C_1 \neq C_2$, the error matrix $C_1-C_2$ has to be full rank in order to obtain diversity NM, and the determinant of $(C_1-C_2)^*(C_1-C_2)$ is large. Two exemplary space-time codes, space-time block and trellis codes, are provided.

For simplicity, assume that there are two transmit antennas (N=2) and M receive antennas. Consider a signal constellation with $2^b$ elements, such as BPSK, QPSK, 8-PSK, 16-QAM. At time one, 2b bits arrive at the encoder and pick up constellation symbols $s_1$ and $s_2$. The transmission matrix is then:

$$S = \begin{pmatrix} s_1 & s_2 \\ -s_2^* & s_1^* \end{pmatrix}. \quad \text{Eq. 3}$$

This is the so-called Alamouti scheme, and is an example of a space-time block code. Maximum likelihood decoding (MLD) of the above code amounts to minimizing the decision metric:

$$\sum_{m=1}^{M} (|r_{1,m} - \alpha_{1,m}s_1 - \alpha_{2,m}s_2|^2 + |r_{2,m} + \alpha_{1,m}s_2^* - \alpha_{2,m}s_1^*|^2) \quad \text{Eq. 4}$$

over all possible values of $s_1$ and $s_2$. It can be shown that the above metric decomposes into two parts, one of which:

$$-\sum_{m=1}^{M} [r_{1,m}\alpha_{1,m}^* s_1^* + r_{1,m}^* \alpha_{1,m} s_1 + r_{2,m} \alpha_{2,m}^* s_1 + r_{2,m}^* \alpha_{2,m} s_1^*] + \quad \text{Eq. 5}$$

$$|s_1|^2 \sum_{m=1}^{M} \sum_{n=1}^{2} |\alpha_{n,m}|^2,$$

is only a function of $s_1$, and the other one:

$$-\sum_{m=1}^{M} [r_{1,m}\alpha_{2,m}^* s_2^* + r_{1,m}^* \alpha_{2,m} s_2 - r_{2,m} \alpha_{1,m}^* s_2 - r_{2,m}^* \alpha_{1,m} s_2^*] + \quad \text{Eq. 6}$$

$$|s_2|^2 \sum_{m=1}^{M} \sum_{n=1}^{2} |\alpha_{n,m}|^2,$$

is only a function of $s_2$. Thus, to decode $s_1$ and $s_2$, respectively, the decoder minimizes the first and the second part of the above metric over all constellation symbols separately. These metrics are equivalent to:

$$\left| \left[ \sum_{m=1}^{M} (r_{1,m}\alpha_{1,m}^* + r_{2,m}^* \alpha_{2,m}) \right] - s_1 \right|^2 + \quad \text{Eq. 7}$$

$$\left( -1 + \sum_{m=1}^{M} \sum_{n=1}^{2} |\alpha_{n,m}|^2 \right) |s_1|^2$$

for decoding $s_1$ and $$\left| \left[ \sum_{m=1}^{M} (r_{1,m}\alpha_{2,m}^* - r_{2,m}^* \alpha_{1,m}) \right] - s_2 \right|^2 + \quad \text{Eq. 8}$$

$$\left( -1 + \sum_{m=1}^{M} \sum_{n=1}^{2} |\alpha_{n,m}|^2 \right) |s_2|^2$$

for decoding $s_2$. Thus, space-time block coding can be implemented using a very simple encoding/decoding algorithm, and achieves full spatial diversity. Trellis codes can also be designed using the space-time design criteria for BPSK, QPSK and 8-PSK, 16-QAM constellations.

The encoding typically starts at the zero state. Inductively, suppose that at time t, the encoder is at state $S_t$. At this time, two bits arrive at the encoder, and choose one of four branches originating from $S_t$. Two labels of that branch are sent from transmit antennas 1 and 2 simultaneously. Subsequently, the encoder moves to the state $S_{t+1}$ at the end of the chosen branch. The decoding of space-time trellis codes can be done using the Viterbi algorithm and it can be shown that this approach provides a 2M level diversity using the above code and M receive antennas.

An approach to increasing the aggregate throughput in wireless data packet networks is to use incremental redundancy. In this approach, the transmitter starts transmitting packets to the receiver with high bandwidth efficiency. If the received data is decoded correctly and this is acknowledged by the transmitter, then no additional action is needed by the transmitter. In the event that a data packet is not correctly received by the receiver, the transmitter sends additional symbols, all or some of which may be redundancy symbols. While these symbols decrease the overall bandwidth efficiency for the transmission of the packet data, they improve the reception. By combining the received words corresponding to these symbols and those of the original packet transmission, additional diversity, coding gain when redundant parity symbols are transmitted, signal energy, or a combination thereof are provided to the receiver, which can be used to correctly decode the transmitted data.

Various types of protocols exist that allow the receiver to inform the transmitter that certain packets were either not received or were corrupted. In response to an indication that a packet was corrupted, the transmitter will retransmit the corrupted packet. Certain communication systems implement an automatic repeat request (ARQ) protocol to provide error control. In general, ARQ-based systems will transmit an acknowledgement (ACK) from the receiver to the transmitter for each packet that is properly received, and send a negative-acknowledgement (NAK) when the receiver is unable to properly recover a packet. Incremental redundancy and ARQ techniques have been studied by those skilled in the art, and there is a vast body of existing literature on these topics. However, for transmission using multiple antennas, incremental redundancy schemes are not known. This is partially due to the fact that in a space-time channel, signals transmitted from different antennas superpose, and this makes it difficult to improve the transmitted signals with increasing redundancy. In this light, there is a need for a way to construct space-time codes to facilitate incremental redundancy in a spatially diverse communication environment.

SUMMARY OF THE INVENTION

The present invention relates to space-time coding techniques capable of providing incremental redundancy in wireless communication environments incorporating spatial and temporal diversity. In general, a transmitter sends packets, via blocks of symbols, to a receiver with high bandwidth efficiency and only in the event that the receiver does not correctly receive a data packet does the transmitter send additional symbols to assist with the decoding of the incorrectly received packet. While these additional symbols decrease the overall bandwidth efficiency for the transmission of the packet data, they improve the reception. Preferably, a hybrid ARQ feedback mechanism is used such that the receiver can inform the transmitter whether the packets were correctly or incorrectly received. From the feedback, the transmitter can determine whether to send new symbols or initiate incremental redundancy. By combining the received words corresponding to the redundant symbols and those of the original packet transmission, additional diversity, coding gain, or a combination thereof are provided to the receiver and are used to correctly decode the transmitted data.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to space-time coding techniques capable of providing incremental redundancy in wireless communication environments incorporating spatial and temporal diversity. In general, a transmitter sends packets, via blocks of symbols, to a receiver with high bandwidth efficiency and only in the event that the receiver does not correctly receive a data packet does the transmitter send additional symbols to assist with the decoding of the incorrectly received packet. While these additional symbols decrease the overall bandwidth efficiency for the transmission of the packet data, they improve the reception. Preferably, a hybrid ARQ feedback mechanism is used such that the receiver can inform the transmitter whether the packets were correctly or incorrectly received. From the feedback, the transmitter can determine whether to send new symbols or initiate incremental redundancy. By combining the received words corresponding to the redundant symbols and those of the original packet transmission, additional diversity, coding gain, signal energy, or a combination thereof are provided to the receiver and are used to correctly decode the transmitted data. A high-level overview of mobile terminal and base station architectures of the present invention is provided prior to delving into details of implementing hybrid ARQ in an STC environment.

Figure 1:
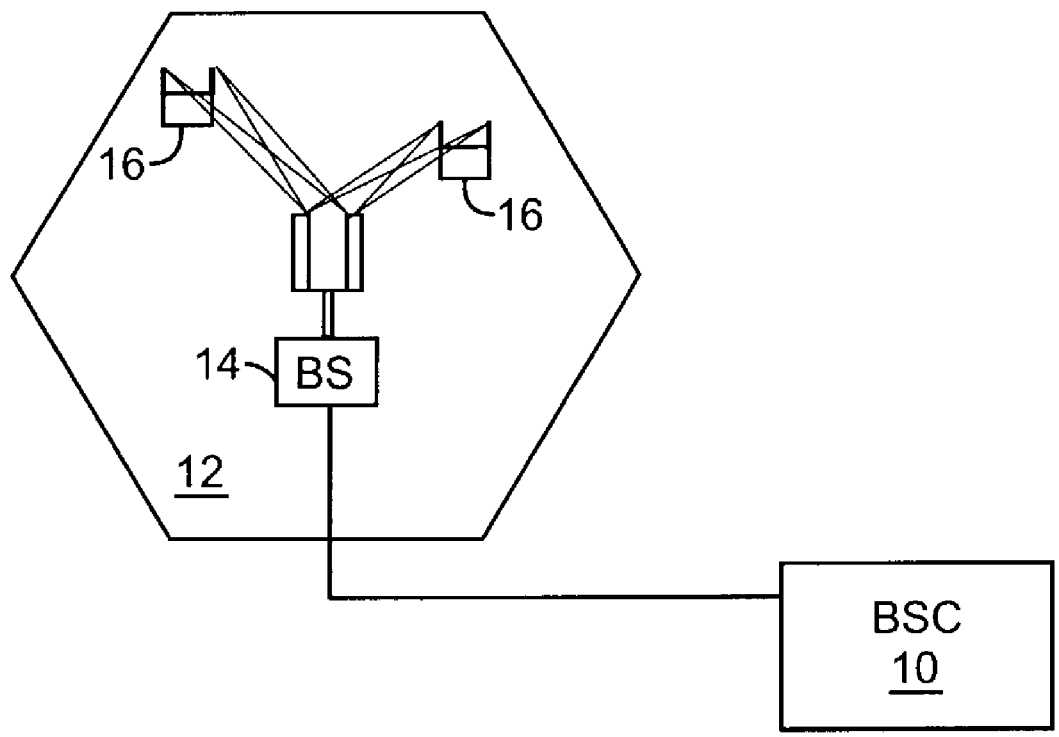
FIG. 1 is a block representation of a wireless communication system according to one embodiment of the present invention.

With reference to FIG. 1, a basic wireless communication environment is illustrated. In general, a base station controller (BSC) 10 controls wireless communications within multiple cells 12, which are served by corresponding base stations (BS) 14. Each base station 14 facilitates communications with mobile terminals 16, which are within the cell 12 associated with the corresponding base station 14. For the present invention, the base stations 14 and mobile terminals 16 include multiple antennas to provide spatial diversity for communications.

Figure 2:
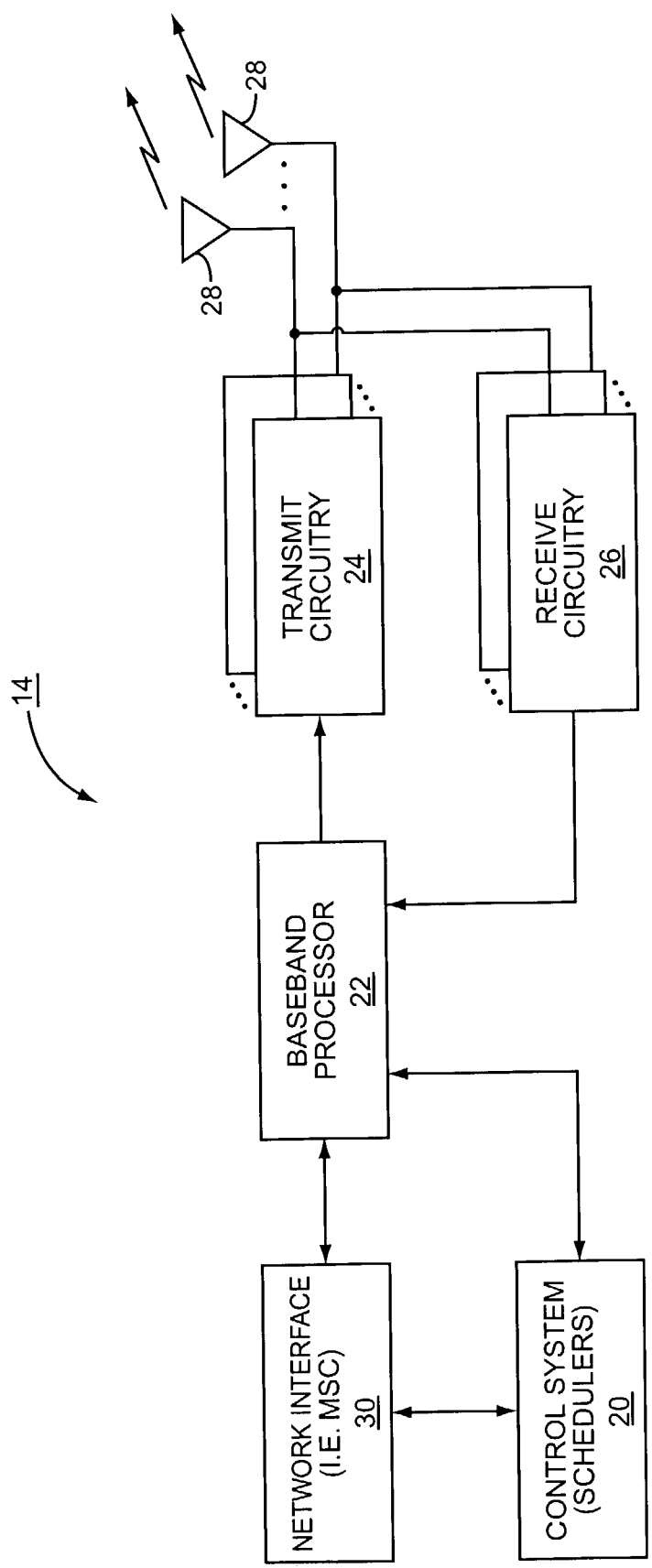
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through the antennas 28 bearing information from one or more remote transmitters provided by mobile terminals 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another mobile terminal 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Modulation and processing details are described in greater detail below.

Figure 3:
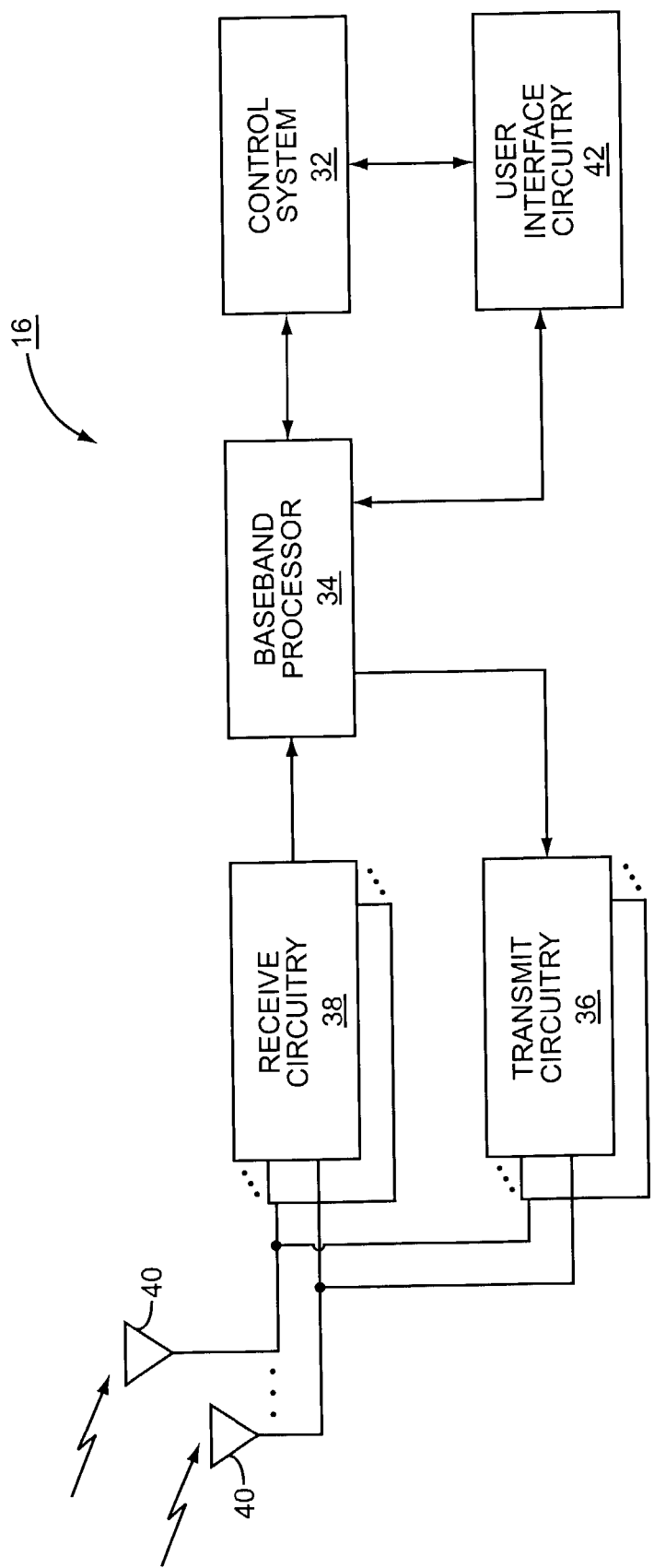
FIG. 3 is a block representation of a mobile terminal according to one embodiment of the present invention.

With reference to FIG. 3, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
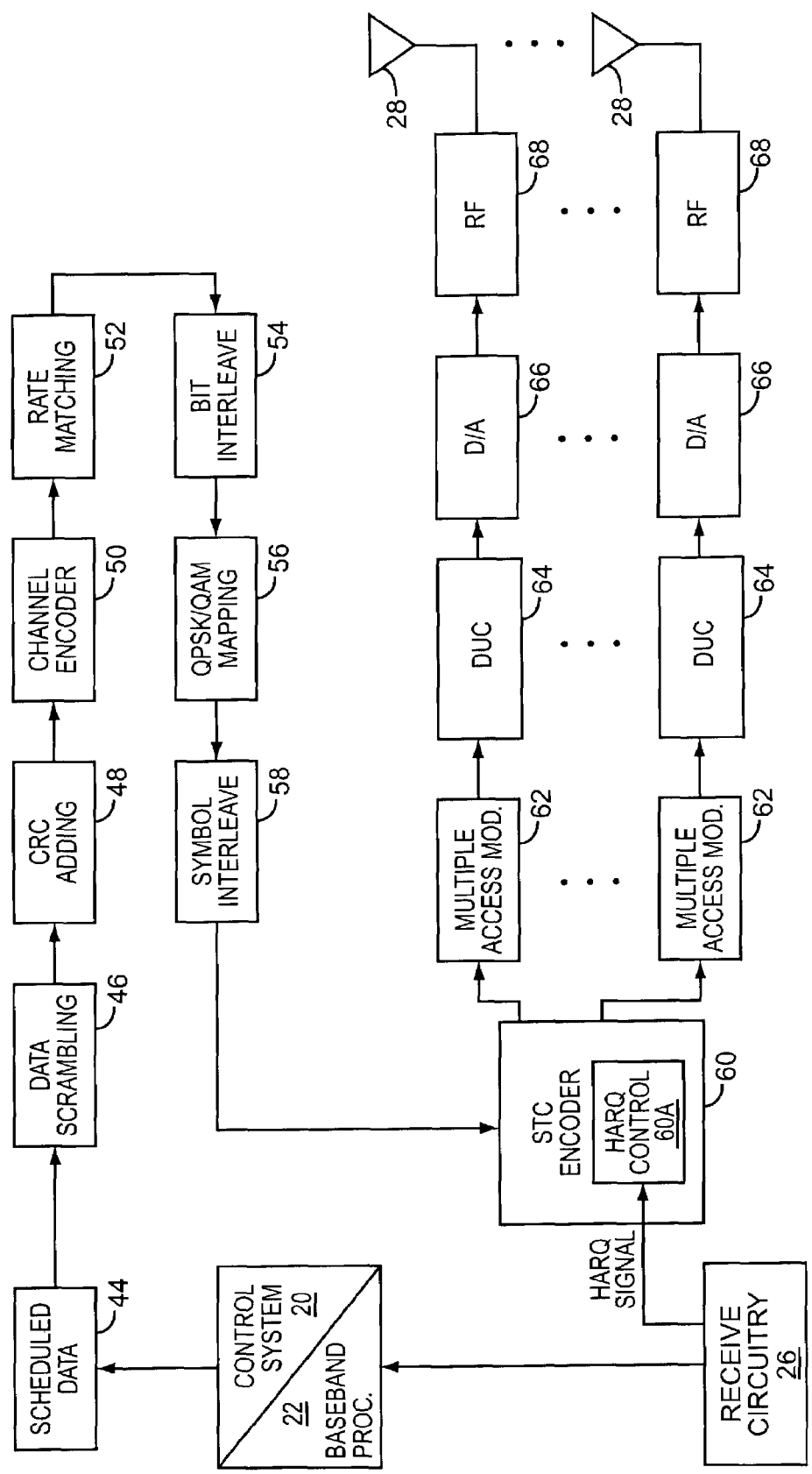
FIG. 4 is a logical breakdown of a transmitter architecture according to one embodiment of the present invention.

With reference to FIG. 4, a logical transmission architecture is provided according to one embodiment of the present invention. The transmission architecture is described as being that of the base station 14, but those skilled in the art will recognize the applicability of the illustrated architecture for both uplink and downlink communications in a variety of wireless environments. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data 44 intended for a mobile terminal 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time code (STC) encoder logic 60 for encoding. The manner in which the blocks of symbols are encoded is based at least in part on a hybrid ARQ (HARQ) signal, which was transmitted from the mobile terminal 16 and recovered by the receive circuitry 26 of the base station 14. The HARQ signal is indicative of the whether previously transmitted data was properly received. If the previously transmitted data was not properly received, the STC encoder logic 60 will retransmit all or a portion of the previously transmitted data to the mobile terminal 16 in the same or a modified format to assist the receiver in recovering the transmitted data. Coding control based on the HARQ signal may be controlled by HARQ control logic 60A associated with the STC encoder 60.

The STC encoding may selectively provide space-time-transmit diversity (STTD) or V-BLAST-type coding. STTD coding encodes data into multiple formats and simultaneously transmits the multiple formats with spatial diversity from the corresponding antennas 28. As will be described in greater detail below, during normal transmission, V-BLAST type coding may be used such that data is separated and transmitted from different ones of the antennas 28 to maximize throughput. When retransmission is required, the previously transmitted data is processed and retransmitted to assist the receiver in recovering the transmitted data, perhaps using STTD.

Thus, the STC encoder logic 60 will process the incoming symbols according to a selected STC encoding mode based in response to the hybrid ARQ signal fed back from the mobile terminal 16 and will then provide n outputs corresponding to the number of transmit antennas 28 to the base station 14. Further detail regarding the STC encoding for the present invention is provided later in the description. At this point, assume the symbols for the n outputs are representative of the data to be transmitted and capable of being recovered by the mobile terminal 16. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For illustration, assume the base station 14 has two antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing, alone or in combination with other processing described herein. For example, the multiple access modulation function 62 in a CDMA function would provide the requisite PN code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDM details, and to RF Microelectronics by Behzad Razavi, 1998 for details regarding CDMA and other multiple access technologies, both of which are incorporated herein by reference in their entireties.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via RF circuitry 68 and antennas 28. Notably, the transmitted data may be preceded by pilot signals, which are known by the intended mobile terminal 16. The mobile terminal 16, which is discussed in detail below, may use the pilot signals for channel estimation and interference suppression, and the header for identification of the base station 14.

Figure 5:
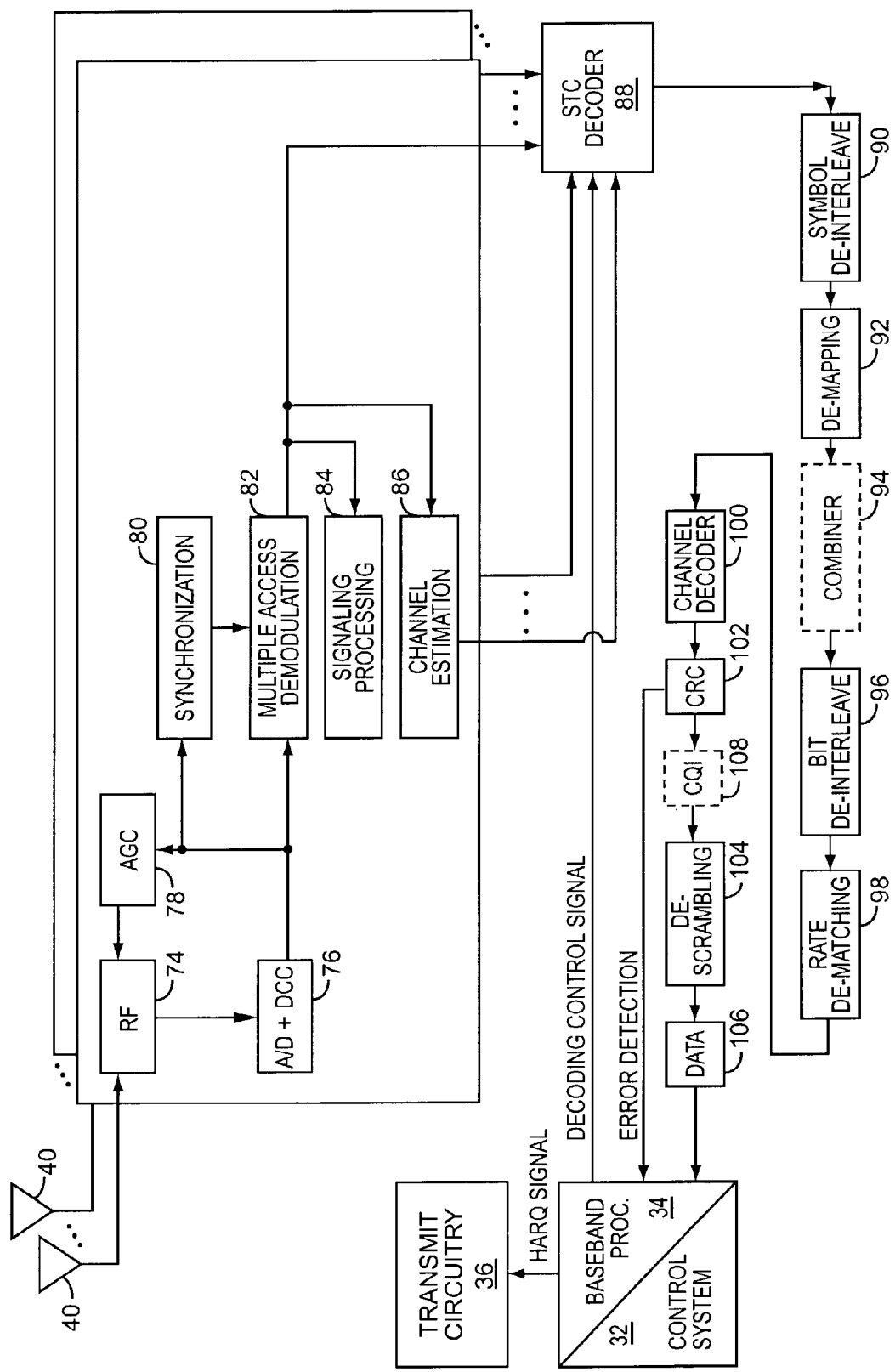
FIG. 5 is a logical breakdown of a receiver architecture according to one embodiment of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 74. For the sake of conciseness and clarity, only one of the multiple receive paths in the receiver is described and illustrated in detail. Analog-to-digital (A/D) conversion and downconversion circuitry (DCC) 76 digitizes and downconverts the analog signal for digital processing. The resultant digitized signal may be used by automatic gain control circuitry (AGC) 78 to control the gain of the amplifiers in the RF circuitry 74 based on the received signal level.

The digitized signal is also fed to synchronization circuitry 80 and a multiple access demodulation function 82, which will recover the incoming signal received at a corresponding antenna 40 at each receiver path. The synchronization circuitry 80 facilitates alignment or correlation of the incoming signal with the multiple access demodulation function 82 to aid recovery of the incoming signal, which is provided to a signaling processing function 84 and channel estimation function 86. The signal processing function 84 processes basic signaling and header information to provide information sufficient to generate a channel quality measurement, which may bear on an overall signal-to-noise ratio for the link, taking into account channel conditions and/or signal-to-noise ratios for each receive path.

The channel estimation function 86 for each receive path provides channel responses corresponding to channel conditions for use by an STC decoder 88. The symbols from the incoming signal and channel estimates for each receive path are provided to the STC decoder 88. The channel estimates provide sufficient channel response information to allow the STC decoder 88 to decode the symbols according to the STC encoding used by the base station 14.

The STC decoder 88 provides STC decoding on each receive path to recover the transmitted symbols based on a decoding control signal derived from the control system 32 or baseband processor 34, which also generates a HARQ signal to send to the base station 14 to indicate whether the incoming data was received properly or if there is need for retransmission. The decoding control signal controls decoding based on the expected coding scheme used by the base station 14 and is ultimately a function of the HARQ signal, because the coding scheme provided by the base station 14 is based on the need for retransmission of lost symbols.

The recovered symbols are placed back in order using symbol de-interleaver logic 90, which corresponds to the symbol interleaver logic 58 of the base station 14. The de-interleaved symbols are then demodulated or de-mapped to a corresponding bitstream using de-mapping logic 92. Depending on the configuration of the receiver architecture, combiner logic 94, such a Chase combiner, which is well known in the art, may optionally be included to combine the energy associated with parallel receive channels to arrive at a soft decision for each bit or group of bits. The bits are then de-interleaved using bit de-interleaver logic 96, which corresponds to the bit interleaver logic 54 of the transmitter architecture. The de-interleaved bits are then processed by rate de-matching logic 98 and presented to channel decoder logic 100 to recover the initially scrambled data and the CRC checksum. Accordingly, CRC logic 102 removes the CRC checksum, checks the scrambled data in traditional fashion, and provides it to de-scrambling logic 104 for de-scrambling using the known base station de-scrambling code to recover the originally transmitted data 106.

Notably, the CRC logic 102 is a convenient place to determine whether incoming data has been properly decoded. An error detection signal can be provided to the control system 32 or baseband processor 34 to indicate whether errors are detected. In response to the error detection signal, the HARQ signal can be generated for transmission to the base station 14 via the transmit circuitry 36. Those skilled in the art will recognize numerous techniques for monitoring incoming bits, symbols, data packets, or a combination thereof for errors and generating the HARO signal.

A channel quality indicator (CQI) may be determined based on the recovered data. An additional or alternative CQI function 108 may be provided anywhere along the data recovery path (blocks 90 through 106) to monitor signal-to-noise ratios, error rates, and like to derive information bearing on individual or overall channel quality. Additional information on one exemplary way to determine a CQI value is provided in co-assigned application Ser. No. 60/329,511, filed Oct. 17, 2001, and entitled METHOD AND APPARATUS FOR CHANNEL QUALITY MEASUREMENT FOR ADAPTIVE MODULATION AND CODING.

Figure 6:
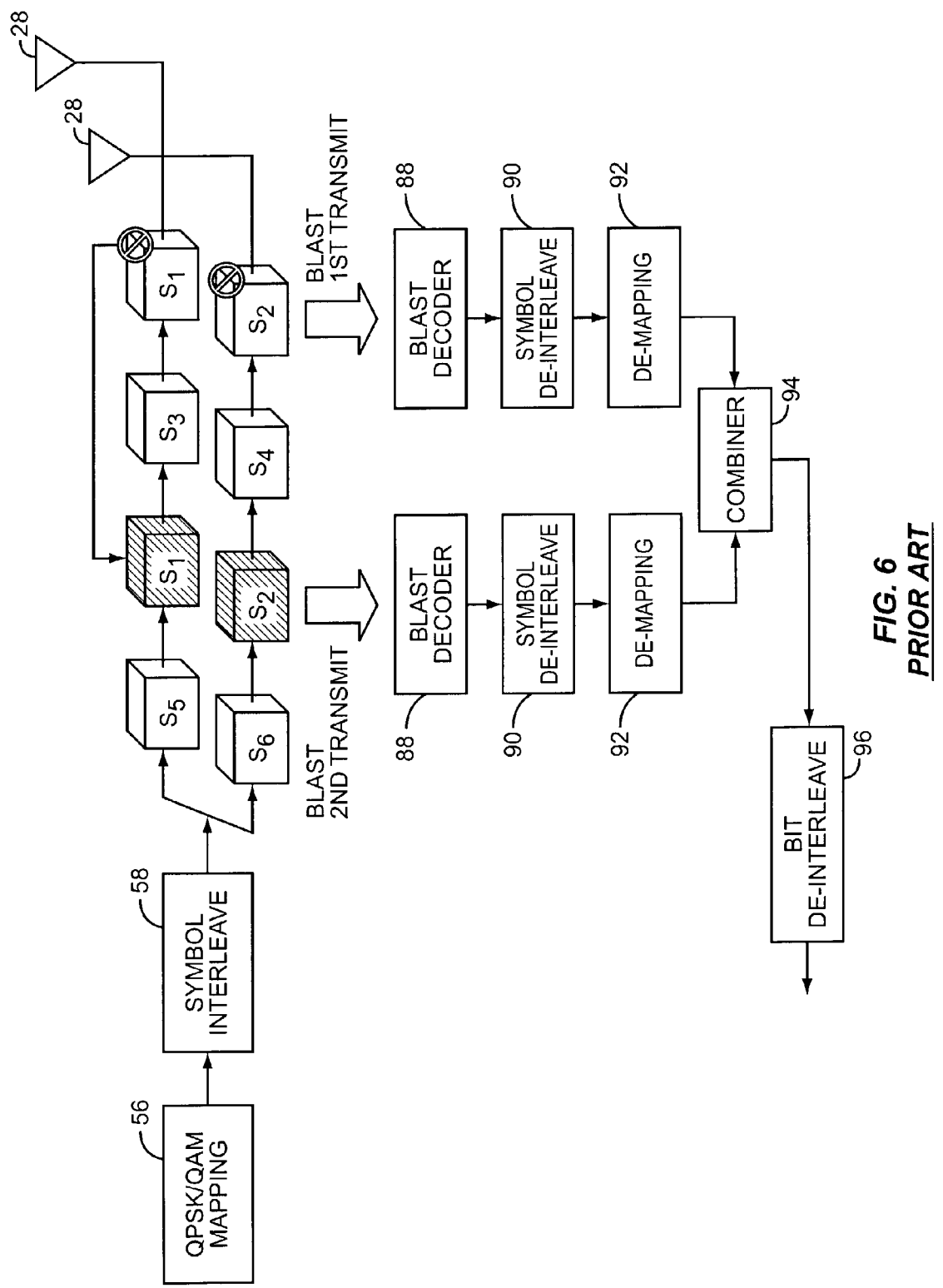
FIG. 6 represents a retransmission technique of the prior art.

Prior to providing illustrative examples for various embodiments of the present invention, an exemplary retransmission scheme of the prior art is provided to aid in understanding the nuances of the present invention. With reference to FIG. 6, bits for data to be transmitted are presented to the QPSK/QAM mapping logic 56 and transformed into symbols, which are interleaved by the symbol interleave logic 58. Assume that there are two transmit antennas 28 and that the interleaved symbols $s_1, s_2, s_3, s_4, s_5, s_6$, and so on, represent interleaved signals to be transmitted to a receiver via the two antennas 28. Further assume that a distribution mechanism, which is not illustrated, alternately allocates the symbols for transmission along transmission paths leading to the antennas 28. As such, during a first transmission period, symbol $s_1$ is transmitted from a first transmit antenna 28 simultaneously with transmitting symbol $s_2$ from a second transmit antenna 28. Likewise, during a second transmit period, symbol $s_3$ is transmitted from the first antenna 28 simultaneously with transmitting symbol $s_4$ from the second transmit antenna 28, and so on and so forth.

For the purposes of illustration, retransmission is discussed on a symbol-by-symbol basis; however, those skilled in the art will recognize that retransmission may require the retransmission of groups of symbols corresponding to all or a portion of a transmitted data packet. In this prior art illustration, assume that the receiver includes an STC decoder 88 providing BLAST decoding for decoding the symbols transmitted during each transmission period. Accordingly, the BLAST decoder 88 will receive the demodulated representations of the two symbols being transmitted from each of the transmit antennas 28, attempt to decode the symbols, and provide decisions to the symbol de-interleave logic 90, which will de-interleave the decoded symbols and send them to de-mapping logic 92. Assume that the receiver determined that symbols $s_1$ and $s_2$, which were transmitted during the first transmission period, could not be decoded, and informed the transmitter of the failed decoding.

The transmitter would respond by simply retransmitting symbols $s_1$ and $s_2$ in a redundant fashion via the same antennas 28. As such, symbol $s_1$ is retransmitted via the first antenna 28 simultaneously with symbol $s_2$ being transmitted via the second antenna 28. As illustrated, the BLAST decoder 88 will attempt to decode the retransmitted symbols $s_1$ and $s_2$ and provide the output to the symbol de-interleave logic 90, which forwards the de-interleaved symbols to the de-mapping logic 92. At this point, the bits corresponding to symbols $s_1$ and $s_2$ of the initial transmission and that of the retransmission are provided to a combiner 94, such as a Chase combiner, to effectively combine the energy associated with the recovered bits in an attempt to recover the transmitted bits. The output of the combiner 94 will represent a hard-decision for the received bits associated with symbols $s_1$ and $s_2$, and the bits are then sent to the bit de-interleave logic 96 and processed in traditional fashion. From the above, the prior art systems simply retransmit data as originally transmitted. Accordingly, neither diversity nor coding gain is significantly improved for retransmission.

Figure 7:
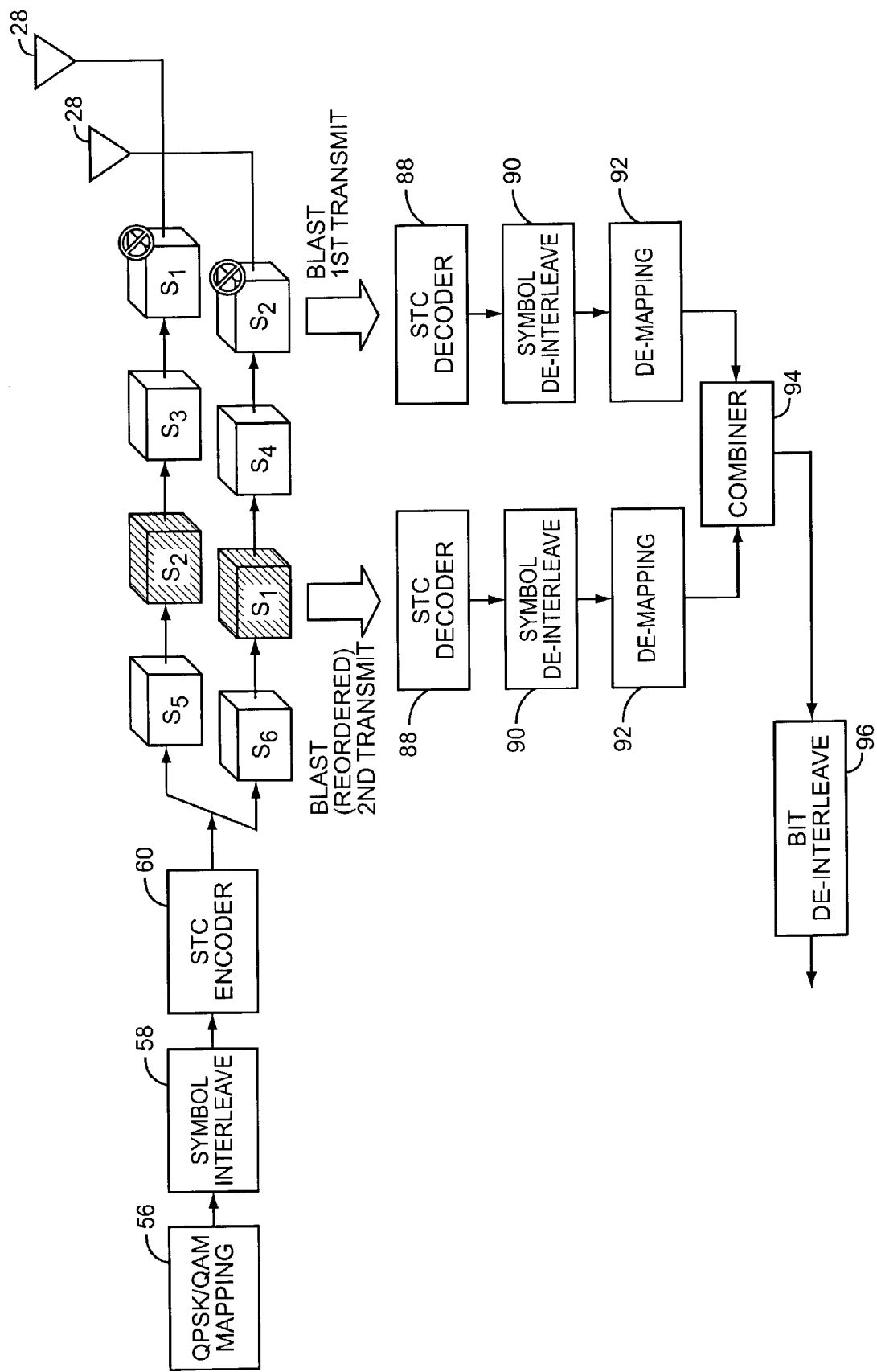
FIG. 7 represents a retransmission technique according to a first embodiment of the present invention.

Turning now to FIG. 7, a first embodiment of the present invention is illustrated. Notably, data bits are provided to the QPSK/QAM mapping logic 56 to create symbols, which are interleaved by symbol interleave logic 58 and passed on to the STC encoder 60. The STC encoder 60 effectively distributes the symbols to be transmitted to effect BLAST encoding, wherein different symbols are transmitted from each of the transmit antennas 28. Operation in this embodiment is similar to that illustrated in FIG. 6. Assuming again that symbols $s_1$ and $s_2$ are not decoded properly, a retransmission request is provided to the transmitter, which causes the STC encoder 60 to retransmit symbols $s_1$ and $s_2$ in a re-ordered fashion, meaning that symbol $s_2$ is transmitted via the first antenna 28 simultaneously with transmitting symbol $s_1$ via the second antenna 28. In this fashion, retransmission of symbols $s_1$ and $s_2$ is provided by different antennas 28, and the symbols are subjected to different channel paths and conditions. During reception, the STC decoder 88 will attempt to decode the received symbols $s_1$ and $s_2$ and re-order them to match that of the original transmission attempt. The decoded symbols are sent to the symbol de-interleave logic 90 and de-mapped into corresponding bits via the de-mapping logic 92. As described above, the combiner logic 94 will combine the de-mapping results for the first transmission and those of the retransmission to provide a hard-decision for bits corresponding to the symbols $s_1$ and $s_2$. The hard-decisions are then sent to the bit de-interleave logic 96 and then on for processing as described above. This embodiment is particularly beneficial for space-time block coding, and results in a somewhat non-orthogonal architecture.

Figure 8:
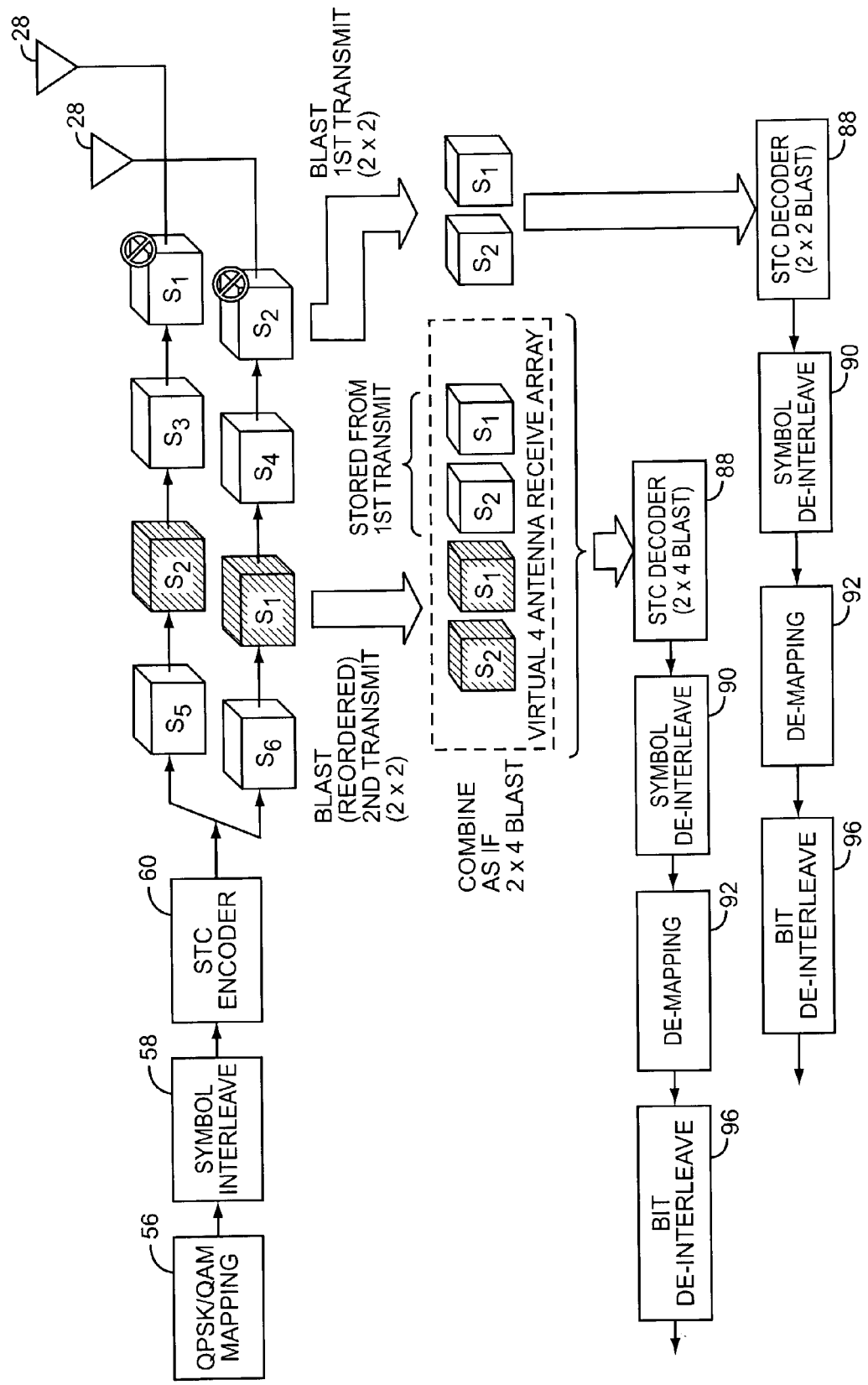
FIG. 8 represents a retransmission technique according to a second embodiment of the present invention.

Turning now to FIG. 8, an enhancement to the embodiment illustrated in FIG. 7 is described. For transmission and retransmission, operation of the transmitter is the same, wherein when symbols $s_1$ and $s_2$ are not decoded properly, they are retransmitted via different antennas 28. Assuming that each transmission is a BLAST transmission, the STC decoder 88 of the receiver will initially attempt to decode the original transmission of symbols $s_1$ and $s_2$ using a 2×2 BLAST decoding technique. Assuming that symbols $s_1$ and $s_2$ are found to be corrupted, the transmitter is signaled accordingly, which will trigger the re-ordered retransmission of the symbols $s_1$ and $s_2$.

During reception of the retransmitted symbols, the STC decoder 88 operates to provide a virtual antenna array by providing a 2×4 BLAST decoding technique using the originally received signals stored from the first transmission along with the symbols received during retransmission. As such, the STC decoder 88 emulates a receiver having a four-antenna array. The extra information from the original transmission is used as if it were simultaneously received with the retransmission, and the STC decoder 88 is configured to process the originally transmitted symbols $s_1$ and $s_2$ along with retransmitted symbols $s_1$ and $s_2$ to provide symbol decisions for the two transmitted symbols $s_1$ and $s_2$. Preferably, the retransmitted symbols $s_1$ and $s_2$ are transmitted from different antennas 28 than the original transmissions of symbols $s_1$ and $s_2$. Thus, the embodiment illustrated in FIG. 8 allows BLAST-type transmissions and retransmission to be effectively decoded at the receiver as if the receiver had more than the actual number of antennas. Notably, this technique does not require a combiner 94, which reduces the complexity of the receiver as well as the complexity of processing when channel conditions are good, such that less complex decoding may be used until retransmission is required.

In a fourth embodiment of the present invention, the retransmission process incorporates orthogonal space-time block codes to further enhance the odds of an effective and efficient retransmission. Prior to discussing the illustration in particular, an overview of orthogonal space-time codes is provided. Initially, consider transmission using two transmit antennas (N=2) in a wireless environment. In high bandwidth efficiency mode, the transmitter sends two uncoded symbols from the two transmit antennas at each time. If L transmissions in each packet correspond to data bits, then 2L constellation symbols are sent per packet, corresponding to 4L transmitted bits. The transmission matrix is given by:

$$S = \begin{pmatrix} s_{1,1} & s_{1,2} \\ s_{2,1} & s_{3,2} \\ \vdots & \vdots \\ s_{L,1} & s_{L,2} \end{pmatrix},$$ Eq. 9 where $s_{1,1}, s_{1,2}, s_{2,1}, s_{2,2}, \ldots, s_{L,1}, s_{L,2}$ are symbols.

The STC decoder 88 at the receiver attempts to decode the above uncoded symbols. When the number of receive antennas M is small, this implies that in order for the receiver to correctly decode the transmitted data, the channel must be good and the receiver must enjoy a reasonable signal to interference and noise ratio. This may not be the case in some occasions, and the receiver may not be able to decode the transmitted packet correctly.

In such a circumstance, assume that the receiver detects that the decoded bits are in error, for instance by using CRC, and then by using some protocol, for instance by using negative acknowledgements, unsuccessful decoding is indicated to the transmitter. At this point the transmitter starts by sending redundancy symbols to the receiver:

$$S = \begin{pmatrix} s_{L+1,1} & s_{L+1,2} \\ s_{L+2,1} & s_{L+2,2} \\ s_{L+3,1} & s_{L+3,2} \\ \vdots & \vdots \\ s_{2L,1} & s_{2L,2} \end{pmatrix}.$$ Eq. 10

These symbols are chosen by the transmitter to satisfy:

$$s_{L+j,1} = -s_{j,2}^*$$

$$s_{L+j,2} = s_{j,1}^*$$ Eq. 11 for $j=1,2,\ldots,L$.

At the receiver, the received signals at time $t=j$ and $t=L+j$ for $j=1,2,\ldots,L$ correspond to transmission using the two antenna space-time block code as previously described. Thus if the channel has remained static during the transmission and retransmission periods, then the receiver can decode the transmitted symbols with a 2M level of diversity. This significantly improves the probability of correct decoding at the receiver. However, as 2L symbols are now transmitted during 2L times, the bandwidth efficiency for the transmission of the packet is reduced. In summary, using the above incremental redundancy scheme for a packet decoded in error, 4L bits are sent in 2L transmissions with a diversity of 2M. For a correctly decoded packet, 4L bits are sent in L transmissions with a diversity of M.

The above technique generalizes to all the space-time block codes described in "Space-Time Block Codes From Orthogonal Designs," by V. Tarokh, H. Jafarkhani and A. R. Calderbank, IEEE Trans. Inform. Theory, Vol. 45, No. 5, pp. 1456-1467, July 1999, which is incorporated herein by reference in its entirety. In an analogous way, the transmitter sends the first rows of code words of space-time block codes for uncoded transmission. Once a packet is decoded incorrectly, all the other rows of these code words matrices are sent. Assuming a static channel, the decoder can then decode the symbols using space-time block decoding as described in Tarokh et al. as referenced above, and better decoding performance can be achieved.

The STC encoder 60 is configured to retransmit coded versions of the originally transmitted signals $s_1$ and $s_2$ when $s_1$ and $s_2$ are not properly received. Thus, the STC encoder 60 generates encoded versions of the originally transmitted symbols $s_1$ and $s_2$. The encoded symbols are referred to as coded retransmitted symbols, and are represented by $s_1^*$ and $-s_2^*$. During reception, the STC decoder 88 of the receiver will store received symbols in case they are not properly decoded. Assume that the originally transmitted symbols $s_1$ and $s_2$ are lost, and that the STC encoder 60 of the transmitter retransmits $s_1^*$ and $-s_2^*$ in response to the need to retransmit symbols $s_1$ and $s_2$. Preferably, the retransmitted symbol $-s_2^*$ is transmitted via the first antenna 28, from which the original symbol $s_1$ was transmitted, and the retransmitted symbol $s_1^*$ is retransmitted via the second transmit antenna 28, from which original symbol $s_2$ was transmitted.

During reception, the first transmission is decoded using normal BLAST techniques, and when the retransmission for originally transmitted symbols $s_1$ and $s_2$ ($s_1^*$ and $-s_2^*$) occurs, the STC decoder 88 will provide space-time block decoding on each of the originally transmitted symbols $s_1$ and $s_2$ and the retransmitted symbols $s_1^*$ and $-s_2^*$ using available STC decoding techniques, such as zero-forcing, minimum mean square error, or MLD as proposed by Nortel Networks or traditional Alamouti decoding. The STC decoder 88 will provide a symbol to the symbol de-interleave logic 90 and the resulting symbols are de-mapped into bits using the de-mapping logic 92 and processing continues as described above. Further, the STC decoder 88, although not optimal, can implement Alamouti decoding as is known to those skilled in the art. In this embodiment, STTD can be viewed as V-BLAST, especially with a larger number of receive antennas increases or virtual antennas. For example, a 2×2 STTD system may be viewed as a 2×4 V-BLAST system as follows:

$$\begin{bmatrix} r_{1,t_1} \\ r_{2,t_1} \\ r_{1,t_2}^* \\ r_{2,t_2}^* \end{bmatrix} = \begin{bmatrix} h_{11,t_1} & h_{12,t_1} \\ h_{21,t_1} & h_{22,t_1} \\ h_{12,t_2}^* & -h_{11,t_2}^* \\ h_{22,t_2}^* & -h_{21,t_2}^* \end{bmatrix} \begin{bmatrix} s_1 \\ s_2 \end{bmatrix},$$ Eq. 12

$$\vec{r} = H\vec{s}$$

and its solution is given by equation 13:

$$\vec{s} = (H^*H)^{-1}H^*\vec{r}.$$ Eq. 13

Again, it can be easily shown that this generalized decoding solution degenerates to the Alamouti solution when:

$$h_{11,t_1} = h_{11,t_2}$$

$$h_{12,t_1} = h_{12,t_2}$$ Eq. 14

$$h_{21,t_1} = h_{21,t_2}$$

$$h_{22,t_1} = h_{22,t_2}$$

Signal orthogonality always provides potential gains. However, whether these gains can be reaped at the receiver depends on how much orthogonality is still maintained. The incremental redundancy STBC provides this potential. Note that equation 13 provides zero-forcing results for equation 12. Other, more sophisticated algorithms, such as iterative MMSE and MLD, can be used to further improve the system performance.

Figure 9:
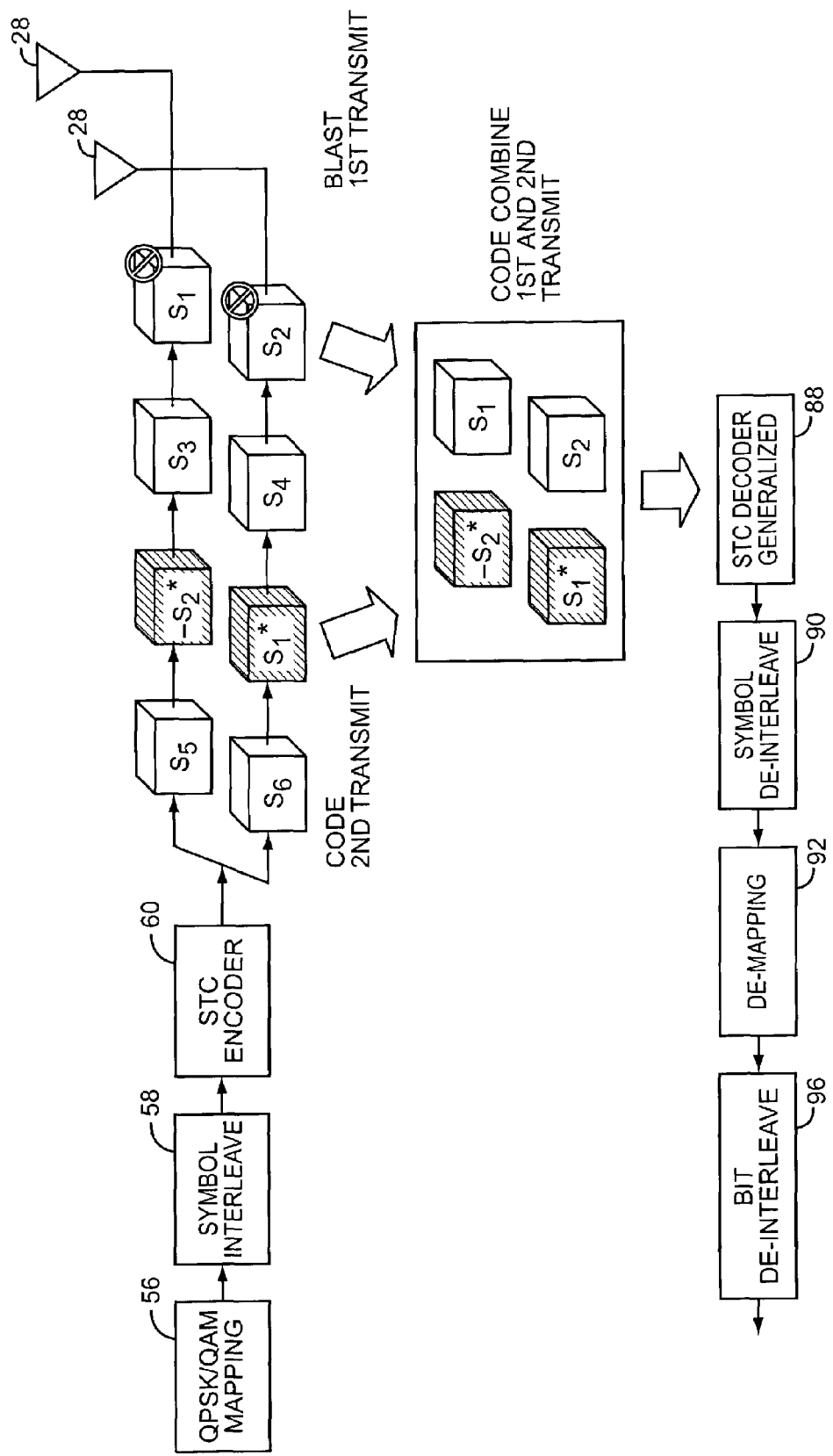
FIG. 9 represents a retransmission technique according to a third embodiment of the present invention.
Figure 10:
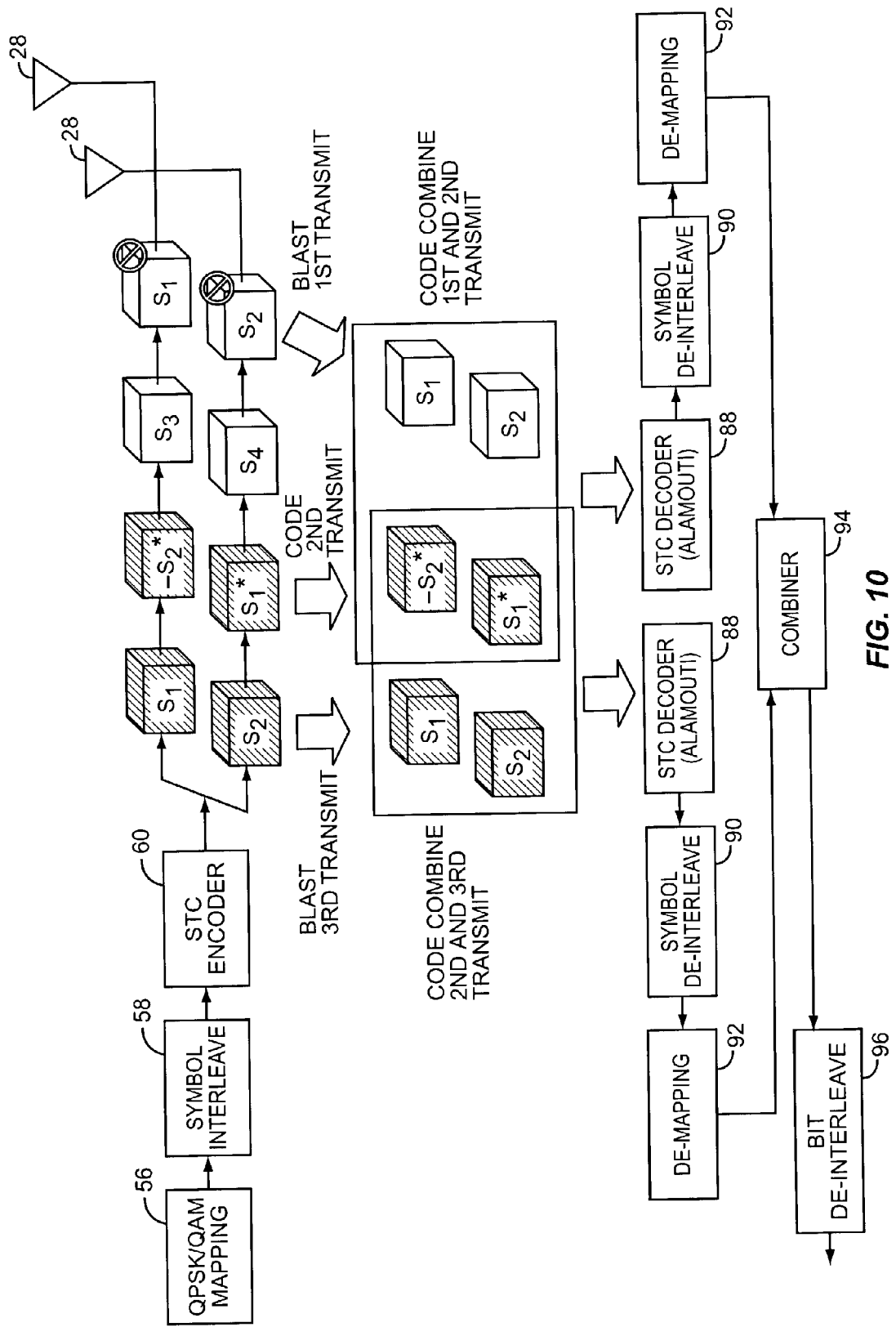
FIG. 10 represents a retransmission technique according to a fourth embodiment of the present invention.
Figure 11:
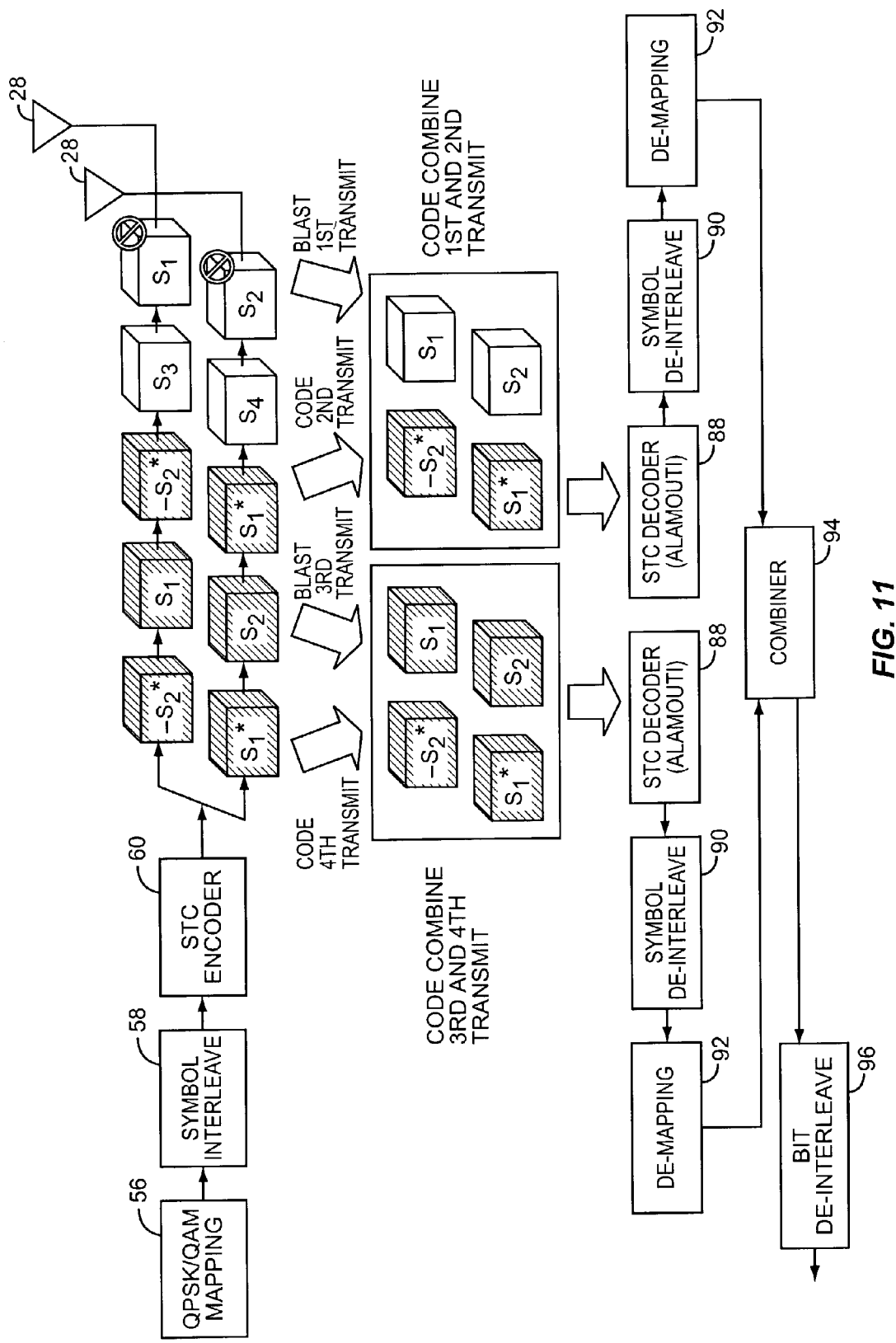
FIG. 11 represents a retransmission technique according to a fifth embodiment of the present invention.

From the embodiment illustrated in FIG. 9, code combining will significantly improve retransmission performance; however, there is still the possibility that symbols $s_1$ and $s_2$ cannot be properly decoded, even upon retransmission of the retransmitted symbols $s_1{}^*$ and $-s_2$. Accordingly, there may be a need for third and fourth retransmissions. FIG. 10 illustrates an exemplary decoding technique when three transmissions are required, and FIG. 11 illustrates a technique wherein four transmissions are required.

With particular reference to FIG. 10, decoding with respect to the third transmission, or the second retransmission, is described. Again assume that symbols $s_1$ and $s_2$ are initially transmitted at the same time via antennas 28. Further assume that a receiver cannot properly decode symbols $s_1$ and $s_2$ and informs the transmitter of the failed decoding attempt. The STC encoder 60 will then retransmit coded versions of the symbols $s_1$ and $s_2$, $s_1{}^*$ and $-s_2{}^*$ in the next available time slot. Again, the retransmitted versions of symbols $s_1$ and $s_2$ are transmitted on different antennas 28 than that when originally transmitted. Thus, the STC decoder 88 attempted basic BLAST decoding, and for the second transmit attempt of symbols $s_1{}^*$ and $-s_2{}^*$, space-time decoding, such as STTD, was provided for the originally transmitted symbols $s_1$ and $s_2$ and the retransmitted symbols $s_1{}^*$ and $-s_2{}^*$. Since the receiver was still unable to properly decode $s_1$ and $s_2$, it indicates the failed decoding attempt to the transmitter, and the STC encoder 60 responds with a third transmission for symbols $s_1$ and $s_2$ by simply retransmitting the original symbols $s_1$ and $s_2$ along the original transmission paths. At the receiver, the STC decoder 88 will attempt to decode the transmitted symbols $s_1$ and $s_2$ by operating on the retransmitted symbols $s_1{}^*$ and $-s_2{}^*$ of the second transmission attempt and the retransmitted versions of the original symbols $s_1$ and $s_2$.

At this point, STC decoding, such as STTD decoding, has been provided on two groups of symbols. The first group includes $s_1$ and $s_2$ (as originally transmitted) and symbols $s_1{}^*$ and $-s_2{}^*$. The second group also includes $s_1{}^*$ and $-s_2{}^*$ from the second transmission, as well as the retransmitted original versions of symbols $s_1$ and $s_2$ from the third transmission. The results of decoding for the first group are de-interleaved and de-mapped, and the resultant bits are sent to the combiner 94 in parallel with bits derived from decoding the second group. Thus, the bits derived from the first and second group decodings are combined simultaneously in an attempt to recover the transmitted data. The resultant bits are processed as described above. Accordingly, the STC decoder 88 may dynamically change from basic BLAST decoding to STC decoding on different groups of symbols and retransmitted symbols as necessary, depending on the number of retransmissions.

To continue the example, assume that the third transmission (second retransmission) was still insufficient for decoding symbols $s_1$ and $s_2$. With reference to FIG. 11, a fourth transmission (third retransmission) case is illustrated. Assume that the first three transmissions are as described in association with FIG. 10, yet result in improperly decoded symbols $s_1$ and $s_2$. As such, the receiver will instruct the transmitter of the failure, and the STC encoder 60 will retransmit the coded symbols $s_1{}^*$ and $-s_2{}^*$. At the receiver, the STC decoder 88 will operate on two groups of symbols. The first group includes the symbols for the first two transmissions, $s_1$, $s_2$, $s_1{}^*$, and $-s_2{}^*$, while the second group includes the symbols for the third and fourth transmissions, $s_1$, $s_2$, $s_1{}^*$, and $-s_2{}^*$. The symbols from the first group are decoded, and then the symbols from the second group are decoded. The results are de-interleaved and de-mapped, and the resulting bits from the decoding of both groups are simultaneously provided to the combiner 94, which will make a hard-decision as to the received bits, and the bits will then be processed as described above.

Figure 12:
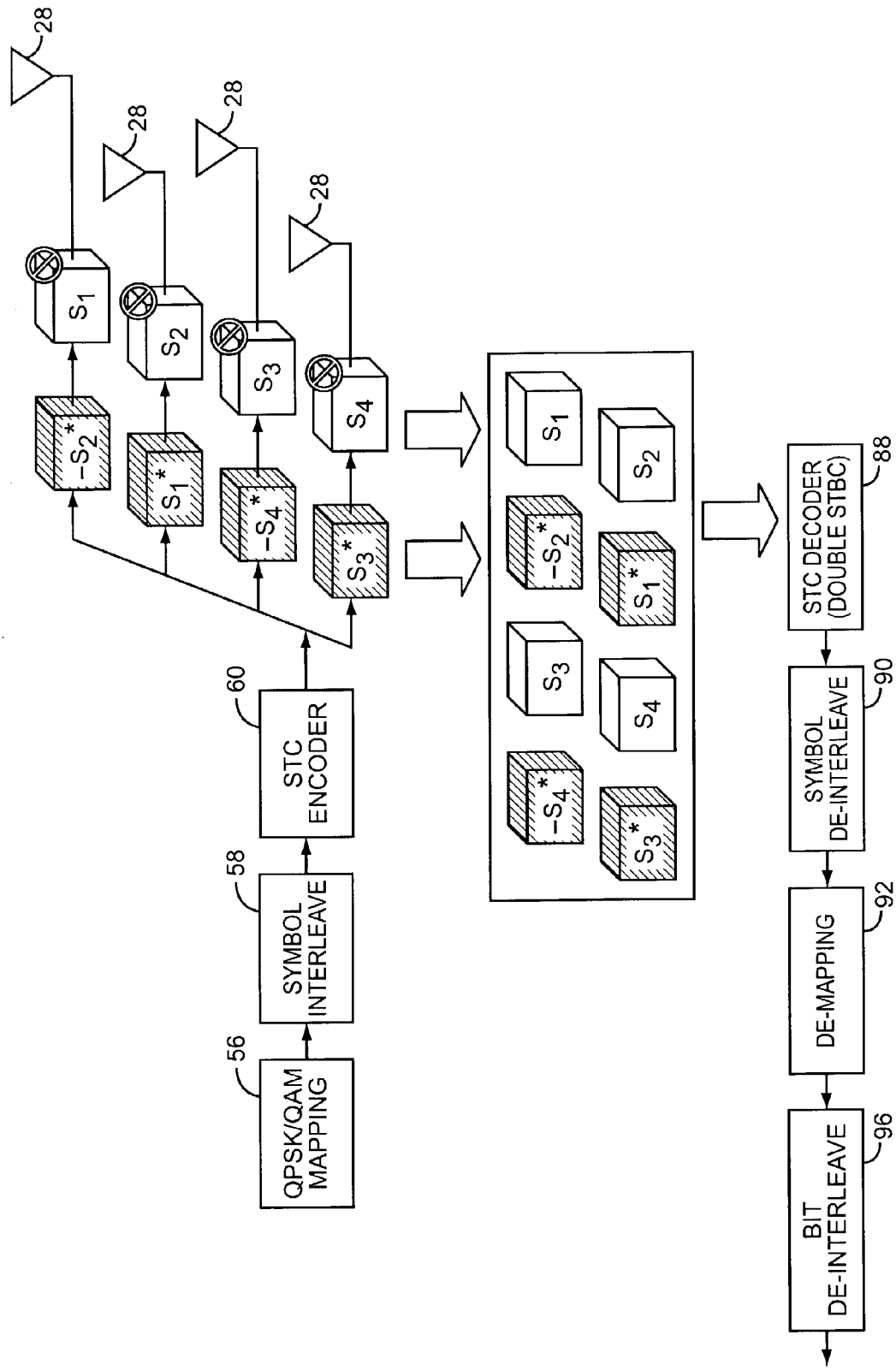
FIG. 12 represents a retransmission technique according to a sixth embodiment of the present invention.

With reference to FIG. 12, failed attempts to receive simultaneously translated symbols $s_1$ through $s_4$ may trigger the STC encoder 60 to simultaneously retransmit space-time coded versions of symbols $s_1$ through $s_4$, which are represented as $s_1{}^*$, $-s_2{}^*$, $s_3{}^*$, and $-s_4{}^*$. After each of the symbols has been received, the STC decoder 88 at the receiver will provide a double STBC decoding function in an attempt to recover symbols $s_1$ through $s_4$ for processing. As such, the present invention is very effective for block retransmissions using STBC coding and decoding.

Figure 13:
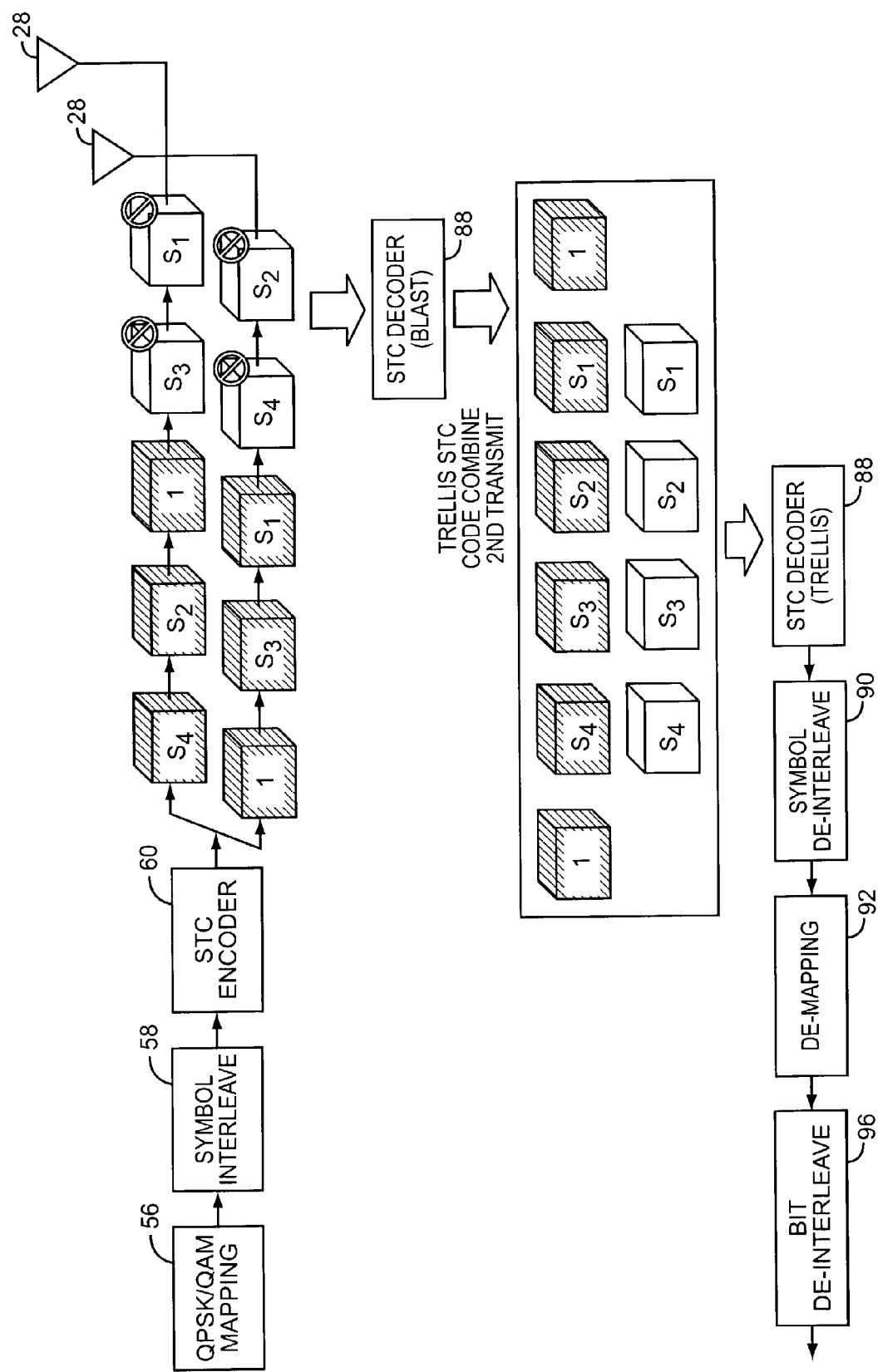
FIG. 13 represents a retransmission technique according to a seventh embodiment of the present invention.

An alternative block retransmission technique is illustrated in FIG. 13, wherein space-time trellis codes are used to provide incremental redundancy.

Consider transmission using two transmit antennas in a wireless environment and assume without loss of generality that the signal constellation is QPSK. In high bandwidth efficiency mode, the transmitter sends two uncoded QPSK symbols from the two transmit antennas at each time. If L transmissions in each packet correspond to data bits, then 2L constellation symbols are sent per packet corresponding to 4L transmitted bits. The transmission matrix is given by:

$$S = \begin{pmatrix} s_{1,1} & s_{1,2} \\ s_{2,1} & s_{2,2} \\ s_{3,1} & s_{3,2} \\ \vdots & \vdots \\ s_{L,1} & s_{L,2} \end{pmatrix}, \qquad \text{Eq. 15}$$

where $s_{1,1}$, $s_{1,2}$, $s_{2,1}$, $s_{2,2}$, ..., $s_{L,1}$, $s_{L,2}$ are QPSK symbols.

The STC decoder 88 attempts to decode the above uncoded symbols. This uncoded transmission scheme provides M level diversity, assuming M receive antennas. When the number of receive antennas M is small, this implies that in order for the receiver to correctly decode the transmitted data, the channel must be good and the receiver must enjoy a reasonable signal to interference and noise ratio. This may not be the case in some occasions, and the receiver may not be able to decode the transmitted packet correctly. In such a circumstance, assume that the receiver detects that the decoded bits are in error. Then by using some protocol, unsuccessful decoding is indicated to the transmitter. At this point, the transmitter starts by sending redundancy symbols:

$$S = \begin{pmatrix} s_{L+1,1} & s_{L+1,2} \\ s_{L+2,1} & s_{L+2,2} \\ s_{L+3,1} & s_{L+3,2} \\ \vdots & \vdots \\ s_{2L+1,1} & s_{2L+1,2} \end{pmatrix} \qquad \text{Eq. 16}$$

to the receiver. These symbols are chosen by the transmitter to satisfy:

$s_{L+1,1}=1$, $s_{L+j,1}=s_{j-1,2}, j=2,3,\ldots,L+1$ \hfill Eq. 17

$s_{L+j,2}=s_{j,1}, j=1,2,3,\ldots,L$, $s_{2L+1,2}=1$.

In this way, L+1 redundant transmissions are sent. At the decoder, the receiver re-orders the received words in the order given by $r_{L+1,j}$, $r_{1,j}$, $r_{L+2,j}$, $r_{2,j}$, ..., $r_{2L,j}$, $r_{L,j}$, $r_{2L+1,j}$ for $j=1,2,...,M$ and observes that this is the received word corresponding to a trellis path that starts from the zero state and ends in the zero state. The path can be determined using the Viterbi algorithm and the transmitted symbols can be computed with diversity 2M.

The process significantly improves the probability of correct decoding at the receiver. However, as 2L symbols are now transmitted during 2L+1 times, the bandwidth efficiency of for the transmission of the packet is reduced. In summary, using the above incremental redundancy scheme for a packet decoded in error, 4L bits are sent in 2L+1 transmissions with a diversity of 2M. For a correctly decoded packet, 4L bits are sent in L transmission with a diversity of M.

The above technique can be generalized to any number of transmit antennas N. The following example gives such a scenario. Consider transmissions using three transmit antennas in a wireless environment and assume without loss of generality that the signal constellation is QPSK. In high bandwidth efficiency mode, the transmitter sends three uncoded QPSK symbols from the three transmit antennas at each transmit time. If L transmissions in each packet correspond to data bits, then 3L constellation symbols are sent per packet corresponding to 6L transmitted bits. The transmission matrix is given by:

$$S = \begin{pmatrix} s_{1,1} & s_{1,2} & s_{1,3} \\ s_{2,1} & s_{2,2} & s_{2,3} \\ s_{3,1} & s_{3,2} & s_{3,3} \\ \vdots & \vdots & \vdots \\ s_{L,1} & s_{L,2} & s_{L,3} \end{pmatrix},$$ Eq. 18 where $s_{1,1}, s_{1,2}, s_{1,3}, s_{2,1}, s_{2,2}, s_{2,3}, \ldots, s_{L,1}, s_{L,2}, s_{L,3}$ are QPSK symbols.

The STC decoder 88 attempts to decode the above uncoded symbols. This uncoded transmission scheme provides M level diversity, assuming M receive antennas. When the number of receive antennas M is small, this implies that in order for the receiver to correctly decode the transmitted data, the receiver channel must be good and it must enjoy a reasonable signal to interference and noise ratio. This may not be the case in some occasions, and the receiver may not be able to decode the transmitted packet correctly.

In such a circumstance, assume that the receiver detects that the decoded bits are in error. Then by using some protocol, unsuccessful decoding is indicated to the transmitter. At this point the transmitter starts by sending redundancy symbols to the receiver:

$$S = \begin{pmatrix} s_{L+1,1} & s_{L+1,2} & s_{L+1,3} \\ s_{L+2,1} & s_{L+2,2} & s_{L+2,3} \\ s_{L-3,1} & s_{L+3,2} & s_{L+3,3} \\ \vdots & \vdots & \vdots \\ s_{3L+2,1} & s_{3L+2,2} & s_{3L+2,3} \end{pmatrix}$$ Eq. 19

These symbols are chosen by the transmitter to satisfy:

$s_{L+1,1} = s_{L+1,2} = 1, s_{L+1,3} = s_{1,1},$ $s_{L+2,1} = 1, s_{L+2,2} = s_{1,1}, s_{L+2,3} = s_{1,2},$ $s_{L+2j+1,1} = s_{j,2}, s_{L+2j+1,2} = s_{j,3}, j=1,2,\ldots,L,$ $s_{L+2j+1,3} = s_{j+1,1}, j=1,2,\ldots,L-1,$ Eq. 20

$s_{L+2j+2,1} = s_{L+2j+1,2}, s_{L+2j+2,2} = s_{L+2j+1,3}, j=1,2,3,\ldots,L,$ $s_{L+2j+2,3} = s_{j+1,2}, j=1,2,\ldots,L-1,$ $s_{3L+1,1} = s_{L,2}, s_{3L+1,2} = s_{L,3}, s_{3L+1,3} = 1,$ $s_{3L+2,1} = s_{L,3}, s_{3L-2,2} = s_{3L+2,3} = 1.$ In this way, 2L+2 redundant transmissions are sent. At the STC decoder 88, the receiver re-orders the received words in the order given by $r_{L+1,j}, r_{L+2,j}, r_{1,j}, r_{L+3,j}, r_{L+4,j}, r_{2,j}, \ldots, r_{3L-1,j}, r_{3L,j}, r_{L,j}, r_{3L+1,j}, r_{3L+2,j}$ for $j=1,2,\ldots,M$ and observes that this is the received word corresponding to a path in the 16 state trellis diagram of the space-time code corresponding to delay diversity with 3 transmit antennas as described in "Space-time codes for high data rate wireless communication: performance analysis and code construction," by V. Tarokh, N. Seshadri and A. R. Calderbank, IEEE Trans. Inform. Theory, pp. 744-765, March 1998, which is incorporated herein by reference in its entirety. This path can be determined using the Viterbi algorithm and the transmitted symbols can be computed with a diversity of 3M.

This significantly improves the probability of correct decoding at the receiver. However as 3L symbols are now transmitted during 3L+2 times, the bandwidth efficiency of for the transmission of the packet is reduced. In summary, using the above incremental redundancy scheme for a packet decoded in error, 6L bits are sent in 3L+2 transmissions with a diversity of 3M. For a correctly decoded packet, 6L bits are sent in L transmissions with diversity M. It is clear from the above two examples that using redundancy symbols, any sequence of uncoded space-time transmissions can be refined to correspond to transmissions corresponding to delay diversity. The trellis diagram of delay diversity and the Viterbi algorithm can be used to improve the performance by employing these redundant transmissions.

With reference to FIG. 14, a trellis-based STC environment is illustrated by example. Assume that during a first transmission slot, symbols $s_1$ and $s_2$ are transmitted, and during a second transmission slot, symbols $s_3$ and $s_4$ are transmitted. Upon receipt, the receiver sends back a HARQ signal indicating that symbols $s_1$ through $s_4$ were improperly decoded. As such, the STC encoder 60 will retransmit symbols $s_1$ through $s_4$ using trellis-based encoding. Essentially, symbols $s_1$ through $s_4$ are retransmitted in an alternating fashion, wherein the string starts and ends with a spacing symbol, which preferably has a real value of one. As such, effectively six symbols are transmitted to effect retransmission of the four symbols $s_1$ through $s_4$. Notably, the spacing symbol causes each of the retransmitted symbols $s_1$ through $s_4$ to be transmitted from a different antenna 28 than that of the original transmission.

At the receiver, BLAST decoding is attempted on the originally transmitted symbols $s_1$ through $s_4$. For the retransmitted trellis symbols one, $s_1, s_2, s_3, s_4$, and one, the STC decoder 88 will attempt to provide trellis decoding on the original symbols $s_1$ through $s_4$ and the retransmitted symbols $s_1$ through $s_4$, wherein the spacing symbols are effectively dropped and only used for marking the beginning and end of the retransmitted symbols. The trellis decoder 88 will attempt a decoding and provide symbols to the de-interleave logic 90, which will provide de-interleaved symbols to the de-mapping logic 92 to recover the transmitted bits.

Those skilled in the art will recognize improvements and modifications to the preferred embodiments of the present invention. All such improvements and modifications are considered within the scope of the concepts disclosed herein and the claims that follow.

What is claimed is:

1. A wireless communication device comprising:
    a) transmission circuitry adapted to transmit symbols to a remote device via a plurality of antennas to provide spatial diversity;
    b) a space-time encoder associated with the transmission circuitry and adapted to facilitate a first space-time coding technique to provide original symbols for transmission and space-time coded retransmission symbols in response to a request from the remote device, the retransmission symbols corresponding to select ones of the original symbols requiring retransmission to the remote device and processed in a manner such that the original symbols and the retransmission symbols are decoded in combination using a second space-time coding technique.

2. The wireless communication device of claim 1 wherein the space-time encoder is further adapted to transmit a first set of original symbols during a first transmission period via the plurality of antennas and transmit a first set of retransmission symbols during a second transmission period, the retransmission symbols being the first set of original symbols reordered for transmission from different ones of the plurality of antennas than the first set of original symbols.

3. The wireless communication device of claim 1 wherein the space-time encoder is further adapted to transmit a first set of original symbols during a first transmission period via the plurality of antennas and transmit a first set of retransmission symbols during a second transmission period, the retransmission symbols being the first set of original symbols encoded and reordered for transmission from different ones of the plurality of antennas than the first set of original symbols.

4. The wireless communication device of claim 3 wherein the first set of retransmission symbols is encoded using space-time block codes.

5. The wireless communication device of claim 3 wherein the first set of retransmission symbols is encoded using space-time transmit diversity.

6. The wireless communication device of claim 3 wherein the space-time encoder is further adapted to transmit a second set of original symbols during a third transmission period via the plurality of antennas in response to a second request from the remote device.

7. The wireless communication device of claim 6 wherein the space-time encoder is further adapted to transmit a second set of retransmission symbols during a fourth transmission period via the plurality of antennas in response to a third request from the remote device.

8. The wireless communication device of claim 6 wherein the first and second sets of original symbols correspond to one group of symbols.

9. The wireless communication device of claim 6 wherein the first and second sets of original symbols correspond to different groups of symbols.

10. The wireless communication device of claim 1 wherein the original symbols comprise subsets of symbols transmitted at consecutive times during a first transmission period and the retransmission symbols comprise subsets of retransmitted symbols transmitted at consecutive times during a second transmission period such that blocks of symbols are transmitted over the consecutive times during the first transmission period and blocks of retransmission symbols are transmitted over the consecutive times during the second transmission period.

11. The wireless communication device of claim 1 wherein the space-time encoder is further adapted to transmit a first set of original symbols during a first transmission period via the plurality of antennas and transmit a first set of retransmission symbols during a second transmission period, the retransmission symbols being the first set of original symbols encoded using Trellis encoding for transmission from the plurality of antennas.

12. The wireless communication device of claim 1 wherein the request from the remote device is provided according to an automatic retransmission request (ARQ) type protocol.

13. The wireless communication device of claim 12 wherein the request from the remote device is provided according to a hybrid ARQ (HARQ) type protocol.

14. A wireless communication device comprising:
    a) receive circuitry adapted to recover original symbols and retransmission symbols from a remote device via a plurality of antennas to provide spatial diversity and send a request to the remote device to transmit the retransmission symbols, the original symbols and the retransmission symbols encoded for transmission using a first space-time coding technique wherein the retransmission symbols are further encoded to allow the original symbols and the retransmission symbols to be decoded in combination using a second space-time coding technique; and
    b) a space-time decoder associated with the receive circuitry and adapted to facilitate space-time decoding to recover the original symbols by decoding the original symbols and the retransmission symbols in combination using the second space-time decoding technique, the retransmission symbols corresponding to select ones of the original symbols requiring retransmission from the remote device.

15. The wireless communication device of claim 14 further comprising de-mapping logic adapted to determine soft bit decisions associated with the original and retransmitted symbols and a combiner adapted to process the soft bit decisions to provide hard bit decisions, and wherein:
    c) the space-time decoder is further adapted to recover a first set of original symbols during a first transmission period via the plurality of antennas and recover a first set of retransmission symbols during a second transmission period; and
    d) the combiner is further adapted to combine the soft bit decisions associated with the first set of original symbols with the soft bit decisions for the first set of retransmitted symbols to provide hard bit decisions for the first set of original symbols; and
    wherein the first set of retransmission symbols is the first set of original symbols reordered for transmission from different ones of the plurality of antennas of the remote device than the first set of original symbols.

16. The wireless communication device of claim 14 wherein the space-time decoder is further adapted to:
    c) recover a first set of original symbols during a first transmission period via the plurality of antennas;
    d) decode the first set of original symbols using a first decoding technique to determine the original symbols, the first set of original symbols being improperly decoded;
    e) recover a first set of retransmission symbols during a second transmission period; and f) decode the first set of original symbols with the first set of retransmission symbols using a second decoding technique to determine the original symbols.

17. The wireless communication device of claim 16 wherein the first set of retransmission symbols are the first set of original symbols reordered for transmission from different ones of the plurality of antennas than the first set of original symbols.

18. The wireless communication device of claim 14 wherein the space-time decoder is further adapted to:
   c) recover a first set of original symbols during a first transmission period via the plurality of antennas;
   d) decode the first set of original symbols using a first decoding technique to determine the original symbols, the first set of original symbols being improperly decoded;
   e) recover a first set of retransmission symbols during a second transmission period; and
   f) decode the first set of original symbols with the first set of retransmission symbols using space-time block decoding to determine the original symbols.

19. The wireless communication device of claim 18 wherein the first decoding technique is BLAST.

20. The wireless communication device of claim 18 wherein the first set of original symbols and the first set of retransmission symbols are decoded using a generalized decoding technique even during varying channel conditions.

21. The wireless communication device of claim 14 wherein the space-time decoder is further adapted to:
   c) recover a first set of original symbols during a first transmission period via the plurality of antennas;
   d) decode the first set of original symbols using a first decoding technique to determine the original symbols, the first set of original symbols being improperly decoded;
   e) recover a first set of retransmission symbols during a second transmission period;
   f) decode the first set of original symbols with the first set of retransmission symbols using space-time block decoding to determine a first estimate for the original symbols, the first estimate for the original symbols being improperly decoded;
   g) recover a second set of original symbols transmitted during a third transmission period; and
   h) decode the second set of original symbols with the first set of retransmission symbols using space-time block decoding to determine a second estimate for the original symbols.

22. The wireless communication device of claim 21 further comprising de-mapping logic adapted to determine soft bit decisions associated with the original and retransmitted symbols and a combiner adapted to process the soft bit decisions to provide hard bit decisions, and wherein the soft bit decisions associated with the first and second estimates for the original symbols are combined by the combiner to provide hard bit estimates for the original symbols.

23. The wireless communication device of claim 14 wherein the space-time decoder is further adapted to:
   c) recover a first set of original symbols during a first transmission period via the plurality of antennas;
   d) recover a first set of retransmission symbols during a second transmission period,
   e) decode the first set of original symbols with the first set of retransmission symbols using space-time block decoding to determine a first estimate for the original symbols, the first estimate for the original symbols being improperly decoded;
   f) recover a second set of original symbols during a third transmission period;
   g) recover a second set of retransmission symbols during a fourth transmission period; and
   h) decode the second set of original symbols with the second set of retransmission symbols using space-time block decoding to determine a second estimate for the original symbols.

24. The wireless communication device of claim 23 further comprising de-mapping logic adapted to determine soft bit decisions associated with the original and retransmitted symbols and a combiner adapted to process the soft bit decisions to provide hard bit decisions, and wherein the soft bit decisions associated with the first and second estimates for the original symbols are combined by the combiner to provide hard bit estimates for the original symbols.

25. The wireless communication device of claim 14 wherein the space time decoder is further adapted to:
   c) recover a first set of original symbols during a first transmission period via the plurality of antennas;
   d) recover a first set of retransmission symbols during a second transmission period;
   e) recover a second set of original symbols during the first transmission period;
   f) recover a second set of retransmission symbols during the second transmission period;
   g) decode the first and second sets of original symbols with the first and second sets of retransmission symbols using space-time block decoding to determine the original symbols.

26. The wireless communication device of claim 25 wherein the first and second sets of original symbols correspond to one group of symbols.

27. The wireless communication device of claim 25 wherein the first and second sets of original symbols correspond to different groups of symbols.

28. The wireless communication device of claim 14 wherein the original symbols comprise subsets of symbols transmitted at consecutive times during a first transmission period and the retransmission symbols comprise subsets of retransmitted symbols transmitted at consecutive times during a second transmission period such that blocks of symbols are transmitted over the consecutive times during the first transmission period and blocks of retransmission symbols are transmitted over the consecutive times during the second transmission period.

29. A method for facilitating wireless communications comprising:
   a) space-time coding and transmitting original symbols using a first space-time coding technique to a remote device via a plurality of antennas to provide spatial diversity;
   b) space-time encoding and transmitting retransmission symbols using the first space-time coding technique in response to a request from the remote device, the retransmission symbols corresponding to select ones of the original symbols requiring retransmission to the remote device and processed in a manner such that the original symbols and the retransmission symbols are decoded in combination using a second space-time coding technique.

30. The method of claim 29 further comprising transmitting a first set of original symbols during a first transmission period via the plurality of antennas and transmitting a first set of retransmission symbols during a second transmission period, the retransmission symbols being the first set of original symbols reordered for transmission from different ones of the plurality of antennas than the first set of original symbols.

31. The method of claim 29 further comprising transmitting a first set of original symbols during a first transmission period via the plurality of antennas and transmitting a first set of retransmission symbols during a second transmission period, the retransmission symbols being the first set of original symbols encoded and reordered for transmission from different ones of the plurality of antennas than the first set of original symbols.

32. The method of claim 31 wherein the first set of retransmission symbols is encoded using space-time block codes.

33. The method of claim 31 further comprising transmitting a second set of original symbols during a third transmission period via the plurality of antennas in response to a second request from the remote device.

34. The method of claim 33 further comprising transmitting a second set of retransmission symbols during a fourth transmission period via the plurality of antennas in response to a third request from the remote device.

35. The method of claim 34 wherein the first and second sets of original symbols correspond to one group of symbols.

36. The method of claim 34 wherein the first and second sets of original symbols correspond to different groups of symbols.

37. The method of claim 29 wherein the original symbols comprise subsets of symbols transmitted at consecutive times during a first transmission period and the retransmission symbols comprise subsets of retransmitted symbols transmitted at consecutive times during a second transmission period such that blocks of symbols are transmitted over the consecutive times during the first transmission period and blocks of retransmission symbols are transmitted over the consecutive times during the second transmission period.

38. The method of claim 29 further comprising transmitting a first set of original symbols during a first transmission period via the plurality of antennas and transmitting a first set of retransmission symbols during a second transmission period, the retransmission symbols being the first set of original symbols encoded using Trellis encoding for transmission from the plurality of antennas.

39. The method of claim 29 wherein the request from the remote device is provided according to an automatic retransmission request (ARQ) type protocol.

40. The method of claim 39 wherein the request from the remote device is provided according to a hybrid ARQ (HARQ) type protocol.

41. A method comprising:
a) recovering original symbols and retransmission symbols from a remote device via a plurality of antennas to provide spatial diversity, the original symbols and the retransmission symbols encoded for transmission using a first space-time coding technique wherein the retransmission symbols are further encoded to allow the original symbols and the retransmission symbols to be decoded in combination using a second space-time coding technique;
b) sending a request to the remote device to transmit the retransmission symbols; and
c) space-time decoding to recover the original symbols by decoding the original symbols and the retransmission symbols in combination using the second space-time coding technique, the retransmission symbols corresponding to select ones of the original symbols requiring retransmission from the remote device.

42. The method of claim 41 further comprising:
d) determining soft bit decisions associated with the original and retransmitted symbols;
e) processing the soft bit decisions;
f) recovering a first set of original symbols during a first transmission period via the plurality of antennas;
g) recovering a first set of retransmission symbols during a second transmission period, and
h) combining soft bit decisions associated with the first set of original symbols with soft bit decisions for the second set of retransmitted symbols to provide hard bit decisions for the first set of original symbols,
wherein the first set of retransmission symbols is the first set of original symbols reordered for transmission from different ones of the plurality of antennas of the remote device than the first set of original symbols.

43. The method of claim 41 further comprising:
d) recovering a first set of original symbols during a first transmission period via the plurality of antennas;
e) decoding the first set of original symbols using a first decoding technique to determine the original symbols, the first set of original symbols being improperly decoded;
f) recovering a first set of retransmission symbols during a second transmission period; and
g) decoding the first set of original symbols with the first set of retransmission symbols using a second decoding technique to determine the original symbols.

44. The method of claims 43 wherein the first set of retransmission symbols is the first set of original symbols reordered for transmission from different ones of the plurality of antennas than the first set of original symbols.

45. The method of claim 41 further comprising:
d) recovering a first set of original symbols during a first transmission period via the plurality of antennas;
e) decoding the first set of original symbols using a first decoding technique to determine the original symbols, the first set of original symbols being improperly decoded;
f) recovering a first set of retransmission symbols during a second transmission period; and
g) decoding the first set of original symbols with the first set of retransmission symbols using space-time block decoding to determine the original symbols.

46. The method of claim 45 wherein the first decoding technique is BLAST.

47. The method of claim 45 wherein the first set of original symbols and the first set of retransmission symbols are decoded using a generalized decoding technique even during varying channel conditions.

48. The method of claim 41 further comprising:
d) recovering a first set of original symbols during a first transmission period via the plurality of antennas;
e) decoding the first set of original symbols using a first decoding technique to determine the original symbols, the first set of original symbols being improperly decoded;
f) recovering a first set of retransmission symbols during a second transmission period,
g) decoding the first set of original symbols with the first set of retransmission symbols using space-time block decoding to determine a first estimate for the original symbols, the first estimate for the original symbols being improperly decoded;
h) recovering a second set of original symbols during a third transmission period; and i) decoding the second set of original symbols with the first set of retransmission symbols using space-time block decoding to determine a second estimate for the original symbols.

49. The method of claim 48 further comprising determining soft bit decisions associated with the original and retransmitted symbols and combining soft bit decisions to provide hard bit decisions, and wherein soft bit decisions associated with the first and second estimates for the original symbols are combined by a combiner to provide hard bit estimates for the original symbols.

50. The method of claim 41 further comprising:
   d) recovering a first set of original symbols during a first transmission period via the plurality of antennas;
   e) recovering a first set of retransmission symbols during a second transmission period;
   f) decoding the first set of original symbols with the first set of retransmission symbols using space-time block decoding to determine a first estimate for the original symbols, the first estimate for the original symbols being improperly decoded;
   g) recovering a second set of original symbols during a third transmission period;
   h) recovering a second set of retransmission symbols during a fourth transmission period; and
   i) decoding the second set of original symbols with the second set of retransmission symbols using space-time block decoding to determine a second estimate for the original symbols.

51. The method of claim 50 further comprising determining soft bit decisions associated with the original and retransmitted symbols and combining the soft bit decisions to provide hard bit decisions, and wherein soft bit decisions associated with the first and second estimates for the original symbols are combined by the combiner to provide hard bit estimates for the original symbols.

52. The method of claim 41 further comprising:
   d) recovering a first set of original symbols during a first transmission period via the plurality of antennas;
   e) recovering a first set of retransmission symbols during a second transmission period;
   f) recovering a second set of original symbols during the first transmission period;
   g) recovering a second set of retransmission symbols during the second transmission period; and
   h) decoding the first and second sets of original symbols with the first and second sets of retransmission symbols using space-time block decoding to determine the original symbols.

53. The method of claim 52 wherein the first and second sets of original symbols correspond to one group of symbols.

54. The method of claim 52 wherein the first and second sets of original symbols correspond to different groups of symbols.

55. The method of claim 41 wherein the original symbols comprise subsets of symbols transmitted at consecutive times during a first transmission period and the retransmission symbols comprise subsets of retransmitted symbols transmitted at consecutive times during a second transmission period such that blocks of symbols are transmitted over the consecutive times during the first transmission period and blocks of retransmission symbols are transmitted over the consecutive times during the second transmission period.

* * * * *